United States Patent
Miao

(10) Patent No.: US 7,200,166 B1
(45) Date of Patent: Apr. 3, 2007

(54) DUAL-MODE TRANSCEIVER FOR INDOOR AND OUTDOOR ULTRA WIDEBAND COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 768 days.

(21) Appl. No.: 10/616,840

(22) Filed: Jul. 10, 2003

(51) Int. Cl.
  *H04L 5/16* (2006.01)
  *H04L 27/00* (2006.01)
  *H04L 23/00* (2006.01)

(52) U.S. Cl. .................. 375/219; 375/295; 375/316; 375/377

(58) Field of Classification Search ............... 375/130, 375/140, 141, 144, 146, 147, 148, 285, 346, 375/350, 295, 316, 296, 377
See application file for complete search history.

(56) References Cited

U.S. PATENT DOCUMENTS

2004/0198260 A1* 10/2004 Molisch et al. .......... 455/114.1

* cited by examiner

*Primary Examiner*—Tesfaldet Bocure

(57) ABSTRACT

A dual-mode ultra wideband (UWB) communication transceiver is presented to implement two disparate systems for indoor and outdoor UWB operations. During an operation mode, the dual-mode UWB communication transceiver sends and receives indoor or outdoor UWB signals using indoor or outdoor programmable filters with a multichannel-based multicarrier modulator and downconverter. The dual-mode UWB communication transceiver along with novel transmitter and receiver architectures is able to selectively transmit and receive a very-high data rate with scalability and programmability in an indoor and/or outdoor environment.

20 Claims, 30 Drawing Sheets

DUAL-MODE TRANSCEIVER FOR INDOOR AND OUTDOOR ULTRA WIDEBAND COMMUNICATIONS

BACKGROUND

This invention is generally relative to short-range wireless ultra wideband (UWB) communications for indoor and outdoor operations.

On Apr. 22, 2002, U.S. Federal Communications Commission (FCC) released the revision of Part 15 of the Commission's rules regarding UWB transmission systems to permit the marketing and operation of certain types of new products incorporating UWB technology. With appropriate technology, UWB devices can operate using spectrum occupied by existing radio service without causing interference, thereby permitting scarce spectrum resources to be used more efficiently. It has been believed that UWB technology offers significant benefits for Government, public safety, businesses, and consumers under an unlicensed basis of operation spectrum.

The UWB devices can be classified into three types based on the operating restrictions: (1) imaging system including ground penetrating radars and wall, through-wall, surveillance, and medical imaging device, (2) vehicular radar systems, and (3) communications and measurement systems. In general, FCC is adapting unwanted emission limits for the UWB devices that are significantly more stringent than those imposed on other Part 15 devices. In other words, FCC limits outdoor use of the UWB devices to imaging systems, vehicular radar systems, and hand held devices. Limiting the frequency bands, which is based on the −10 dB bandwidth of the UWB emission, within certain UWB products will be permitted to operate. For communications and measurement systems, FCC provides a wide variety of the UWB devices, such as high-speed home and business networking devices as well as storage tank measurement devices under Part 15 of the Commission's rules subject to certain frequency and power limitations. The UWB device must operate in the frequency band from 3.1 GHz to 10.6 GHz. The UWB devices should also satisfy the Part 15.209 limit, which sets emission limits for indoor and outdoor UWB system, for the frequency band below 960 MHz and conform the FCC's emission masks for the frequency band above 960 MHz.

For indoor UWB communication operation, Table 1 lists the FCC restrictions of the emission masks (dBm) along with the frequencies (GHz).

TABLE 1

| Frequency (MHz) | EIRP (dBm) |
| --- | --- |
| 0–960 | −41.3 |
| 960–1610 | −75.3 |
| 1610–1990 | −53.3 |
| 1990–3100 | −51.3 |
| 3100–10600 | −41.3 |
| Above 10600 | −51.3 |

Outdoor handheld UWB communication systems are intended to operate in a peer-to-peer mode without restrictions on a location. However, the outdoor handheld UWB communication systems must operate in the frequency band from 3.1 GHz to 10.6 GHz, with an extremely conservative out of band emission masks to address interference with other communication devices. The outdoor handheld UWB communication systems are permitted to emit at or below the Part 15.209 limit in the frequency band below 960 MHz. The emissions above 960 MHz must conform to the following emission masks as shown in Table 2:

TABLE 2

| Frequency (MHz) | EIRP (dBm) |
| --- | --- |
| 0–960 | −41.3 |
| 960–1610 | −75.3 |
| 1610–1900 | −63.3 |
| 1900–3100 | −61.3 |
| 3100–10600 | −41.3 |
| Above 10600 | −61.3 |

FCC proposed to define an UWB device as any device where the fractional bandwidth is greater than 0.25 based on the formula as follows:

$$FB = 2\left(\frac{f_H - f_L}{f_H + f_L}\right), \quad (1)$$

where $f_H$ is the upper frequency of the −10 dB emission point and $f_L$ is the lower frequency of the −10 dB emission point. The center frequency of UWB transmission is defined as the average of the upper and lower −10 dB points as follows:

$$F_C = \frac{f_H + f_L}{2}. \quad (2)$$

In addition, a minimum frequency bandwidth of 500 MHz must be used for indoor and outdoor UWB communication devices regardless of the center frequency.

The UWB communication devices must be designed to ensure that the indoor operations can only occur in an indoor environment according to the indoor emission masks in Table 1. On the other hand, they must be designed as hand-held UWB devices that may be employed for such activities as peer-to-peer operations according to the outdoor emission masks in Table 2. Such UWB communication devices can be used for wireless communications, particularly for short-range high-speed data transmissions suitable for broadband access to networks.

Since the indoor and outdoor UWB communication devices may have similar structures and operation functions, designing a dual-mode UWB communication device with the ability of using in the indoor and outdoor operation is crucial. This leads to save the cost for a dual-mode indoor and outdoor UWB communication transceiver. However, the dual-mode indoor and outdoor UWB communication transceiver needs to have different transmission and receiver filters, which are key elements to make such the UWB communication transceiver successfully. This is because the dual-mode indoor and outdoor UWB communication transceiver has to meet the different masks of the FCC emission limitations for indoor and outdoor operations.

Thus, there is a continuing need for the UWB communication transceiver with employing a dual-mode architecture of digital transmission-shaping filters and receiver filters for the indoor and outdoor operations.

DETAILED DESCRIPTION

Some embodiments described herein are directed to a dual-mode UWB communication transceiver for the indoor and outdoor operations. The dual-mode UWB communication transceiver may be implemented in hardware, such as in an Application Specific Integrated Circuits (ASIC), digital signal processor, field programmable gate array (FPGA), software, and/or a combination of hardware and software.

Figure 1:
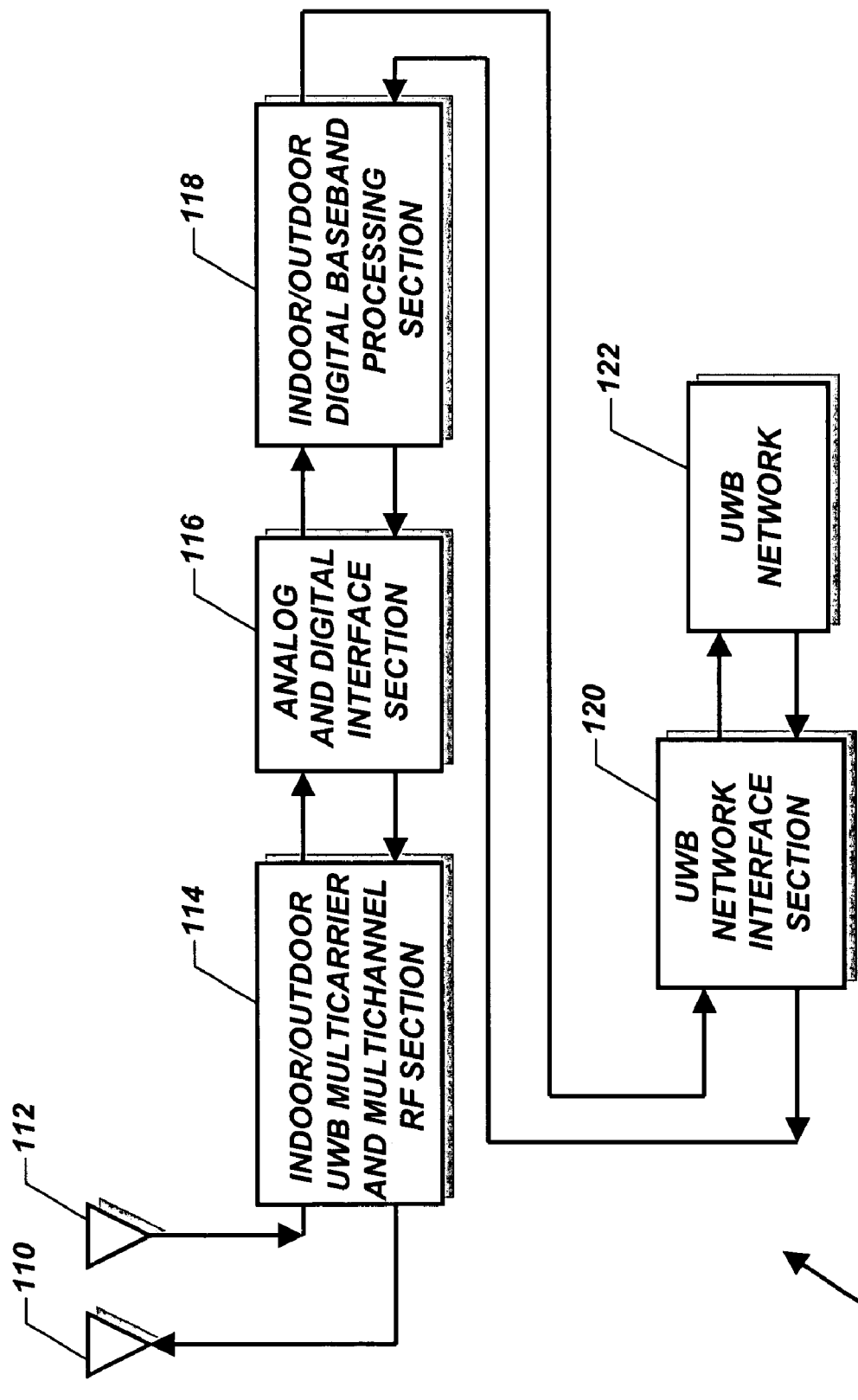
FIG. 1 shows a block diagram of one embodiment of a dual-mode UWB communication transceiver for the indoor and outdoor operation in accordance with the present invention.

FIG. 1 illustrates a dual-mode UWB communication transceiver 100 for the indoor and outdoor operations in accordance with one embodiment of the present invention. This dual-mode UWB communication transceiver 100 includes an indoor or outdoor UWB multi-carrier and multichannel RF section 114 that receives and/or transmits multichannel UWB signals from an antenna 112 or to an antenna 110. The section 114 is connected with an analog and digital interface section 116 that contains A/D and D/A converters. The interface section 116 is coupled to an indoor and outdoor digital baseband processing section 118, which performs multichannel digital transmission and receiver filtering, rake processing, spread/de-spread processing, interleave/de-interleave, and code/de-code processing. The digital baseband processing section 118 has an interface with an UWB network interface section 120, which is coupled to an UWB network 122. In accordance with one embodiment of the present invention, the UWB communication transceiver 100 is referred to as the dual-mode UWB communication transceiver for the indoor and outdoor operations that can both transmit and receive speech, audio, images and video, and data information for indoor and/or outdoor wireless broadband communications.

The dual-mode UWB communication transceiver 100 for the indoor and outdoor operations can transmit and/or receive the UWB signals by using one channel and/or up to 11 channels in parallel. Each channel of the dual-mode UWB communication transceiver 100, which has a frequency bandwidth of 650 MHz, can transmit a data rate of 40.625 Msps. That is, a total of 11 channels are able to transmit 446.875 Msps. The dual-mode UWB communication transceiver 100 also employs orthogonal spread codes to all of the channels. With 16 pseudorandom noise (PN) spread sequence codes for each symbol, each channel achieves a chip data rate of 650 Mcps. As a result, the dual-mode UWB communication transceiver 100 can transmit and/or receive the chip data rate up to 7.150 Gcps during the indoor and/or outdoor operations.

Figure 2:
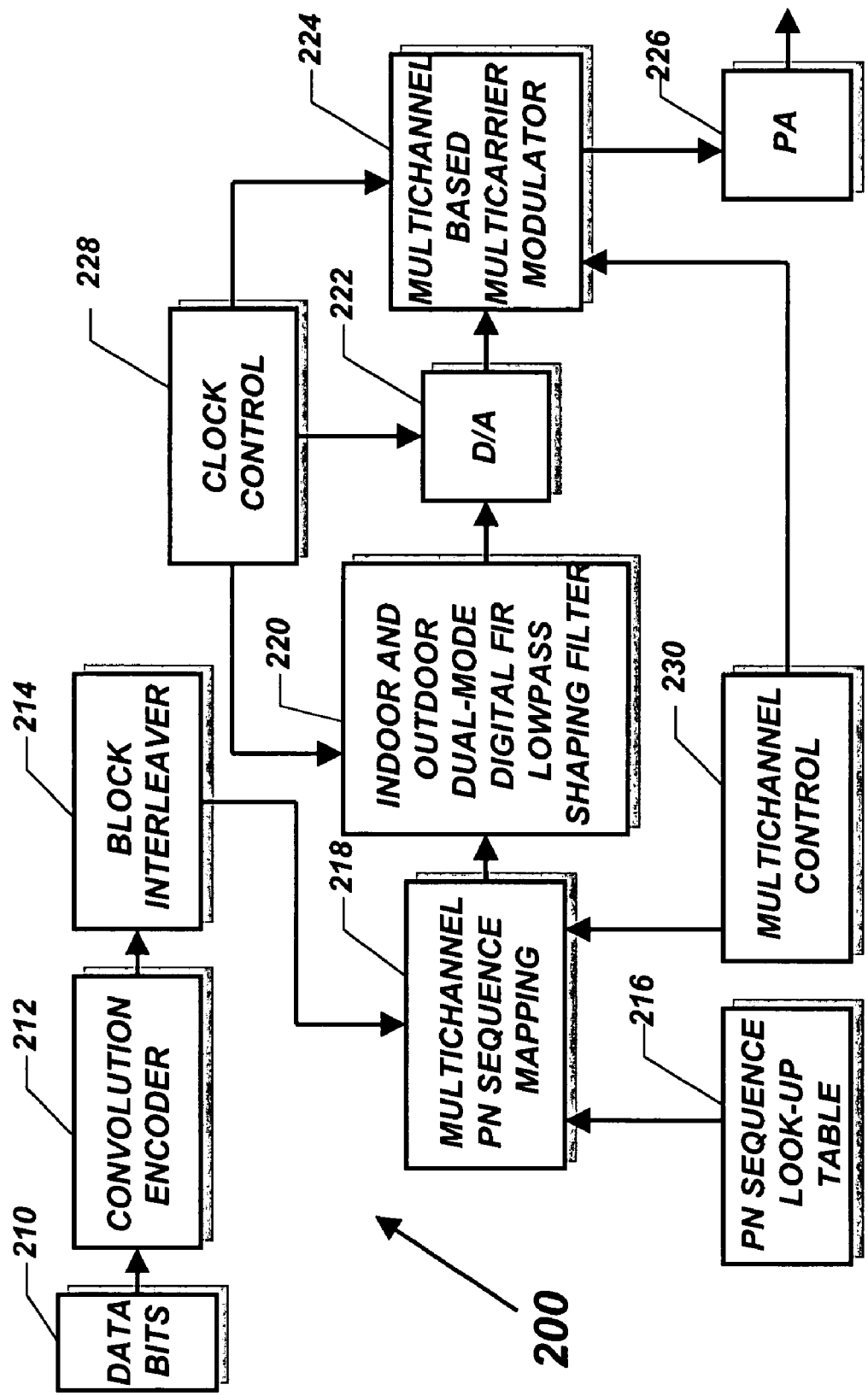
FIG. 2 is a block diagram showing a dual-mode UWB communication transmitter for the indoor and outdoor operation according to some embodiments.

FIG. 2 is a block diagram showing a dual-mode UWB communication transmitter 200 for the indoor and outdoor operations according to some embodiments. The dual-mode UWB communication transmitter 200 receives user data bits 210 with information data rate at 223.4375 Mbps. The user data bits 210 are passed through a ½-rate convolution encoder 212 that may produce a double data rate of 446.875 Msps by adding redundancy bits. A symbol data is then interleaved by using a block interleaver 214. Thus, the output symbols of the block interleaver 214 are formed 11-multichannel by using a multichannel PN sequence mapping 218. The symbol data rate of each channel is about 40.625 Msps. The multichannel PN sequence mapping 218 is used to perform spreading for one symbol data with 16 PN orthogonal spread sequence chips. Thus, each channel produces a chip data rate of 650 Mcps under a multichannel control 230. A PN sequence look-up table 216 provides unique orthogonal sequences to spread each channel. A chip data of each channel is sequentially passed through an indoor or outdoor dual-mode digital FIR lowpass shaping filters 220 to limit each channel signal with a frequency bandwidth of 650 MHz. Each channel signal is passed through a D/A converter 222. The output chip data of each channel from the D/A converter 222 is then modulated with a multi-carrier by using a multichannel-based multi-carrier modulator 224. A clock control 228 is used to control the dual-mode digital FIR lowpass shaping filter 220, the D/A converter 222, and the multichannel-based multi-carrier modulator 224. Thus, the output analog signals of the multichannel-based multi-carrier modulator 224 are passed to a power amplifier (PA) 226 through an antenna into air.

Figure 3:
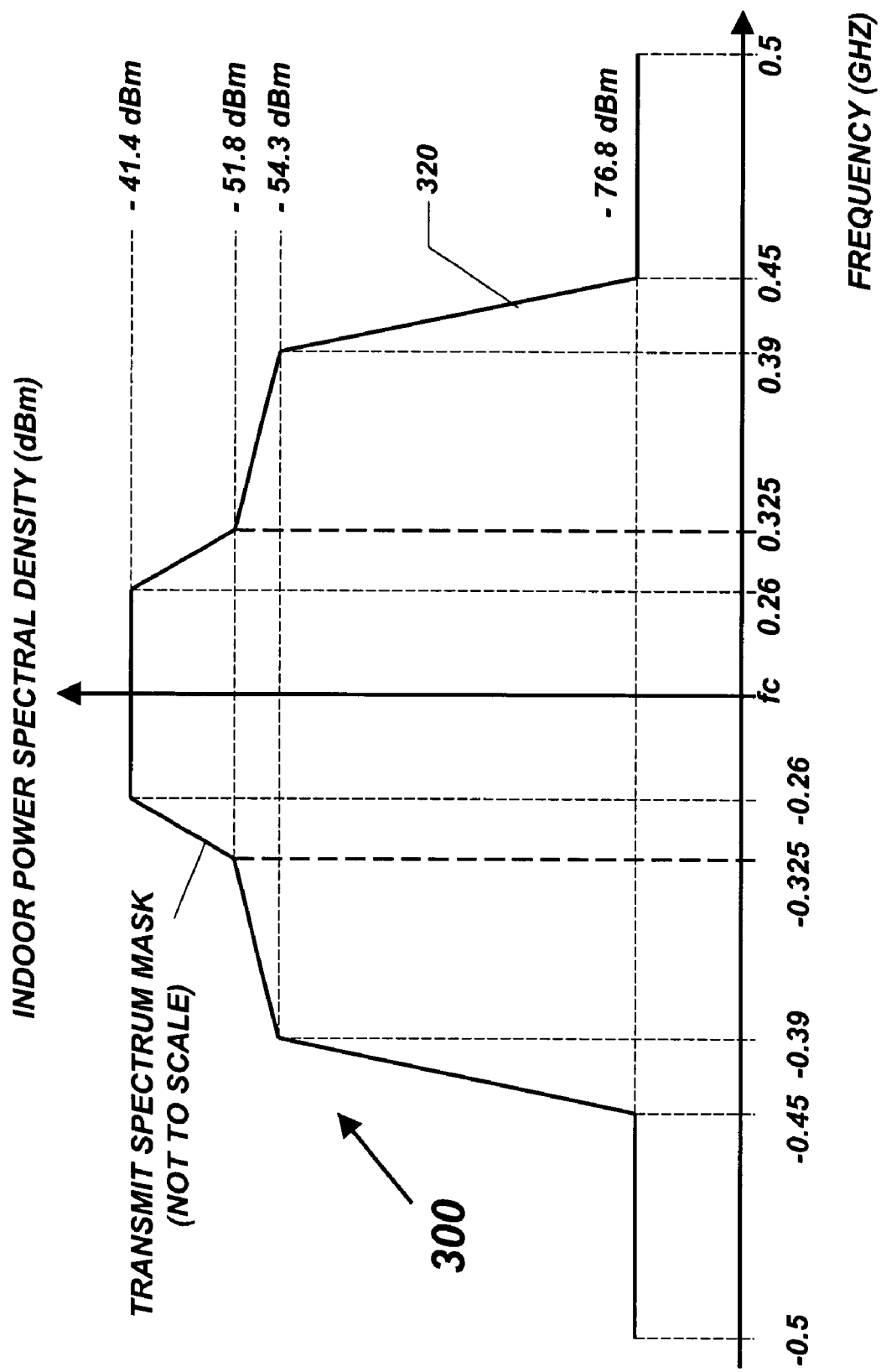
FIG. 3 is a transmitter spectrum mark of an indoor power spectrum density (dBm) according to some embodiments.

FIG. 3 is a transmitter spectrum mark 320 of an indoor power spectral density 300 for each channel according to some embodiments. The magnitudes (dBm) of the frequency response with an error of $\pm\delta_i$ (i=1, 2, 3, 4) according to the frequencies (GHz) are given by, $$(-41.4-\delta_1) \leq |H(f)| \leq (-41.4+\delta_1), |f-f_c| \leq 0.26, \quad (3)$$

$$|H(f)| \leq (-51.8+\delta_2), |f-f_c|=0.325, \quad (4)$$

$$|H(f)| \leq (-54.3+\delta_3), |f-f_c|=0.39, \quad (5)$$

$$|H(f)| \leq (-76.8+\delta_4), 0.45 \leq |f-f_c| \leq 0.5. \quad (6)$$

The transmitter spectrum mark 320 serves as a guide to design a digital FIR lowpass-shaping transmitter for the indoor UWB communication transceiver.

Figure 4:
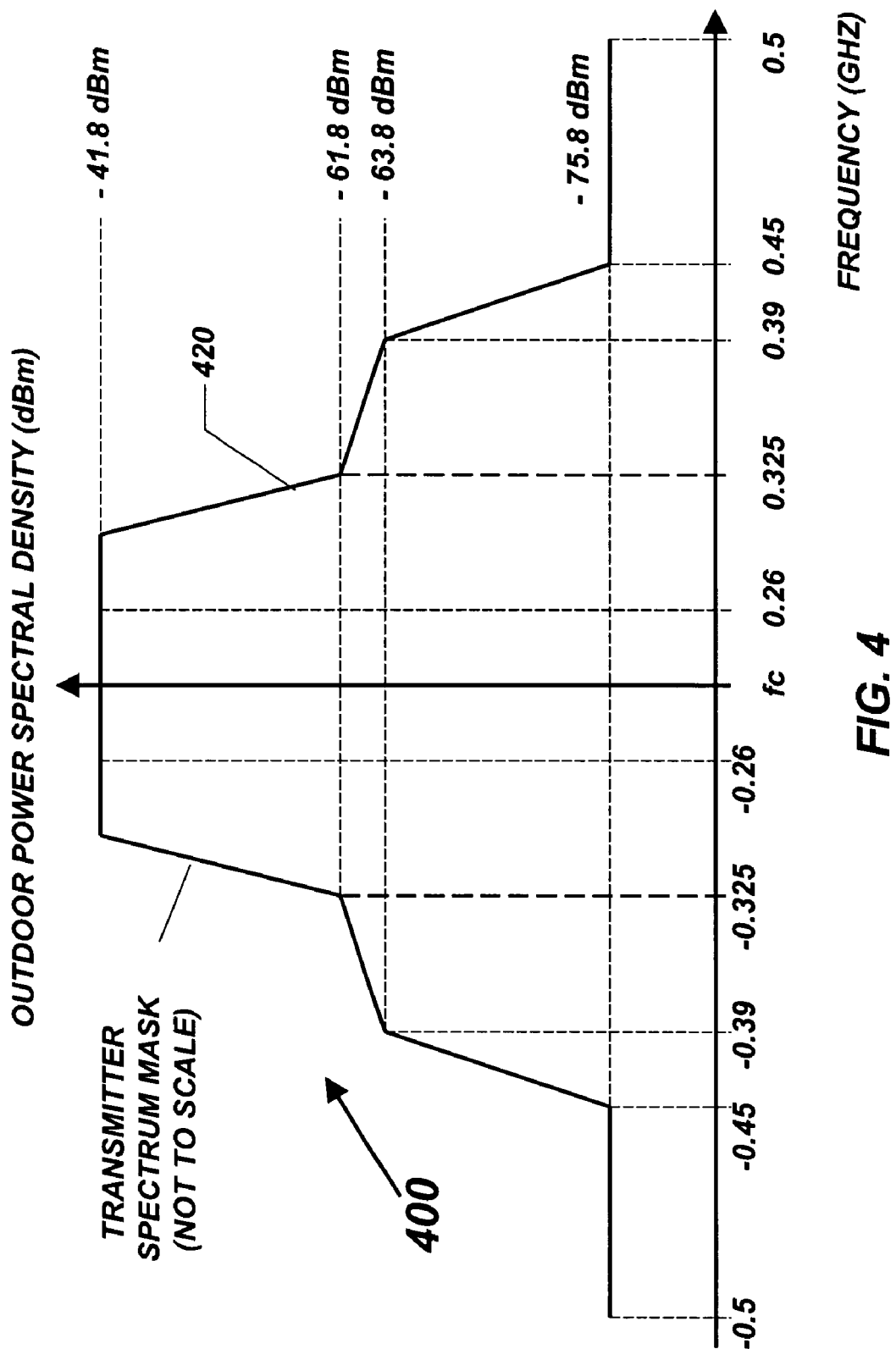
FIG. 4 is a transmitter spectrum mark of an outdoor power spectrum density (dBm) according to some embodiments.

FIG. 4 is a transmitter spectrum mark 420 of an outdoor power spectral density 400 using in each channel transmitter filter according to some embodiments. The magnitudes (dBm) of the frequency response with an error of $\pm\delta_i$ (i=1, 2, 3, 4) according to the frequencies (GHz) are given by, $$(-41.8-\delta_1) \leq |H(f)| \leq (-41.8+\delta_1), |f-f_c| \leq 0.26, \quad (3)$$

$$|H(f)| \leq (-61.8+\delta_2), |f-f_c|=0.325, \quad (4)$$

$$|H(f)| \leq (-63.8+\delta_3), |f-f_c|=0.39, \quad (5)$$

$$|H(f)| \leq (-75.8+\delta_4), 0.45 \leq |f-f_c| \leq 0.5. \quad (6)$$

The transmitter spectrum mark 420 serves as a guide to design the digital FIR lowpass-shaping transmitter for the outdoor UWB communication transceiver.

Figure 5:
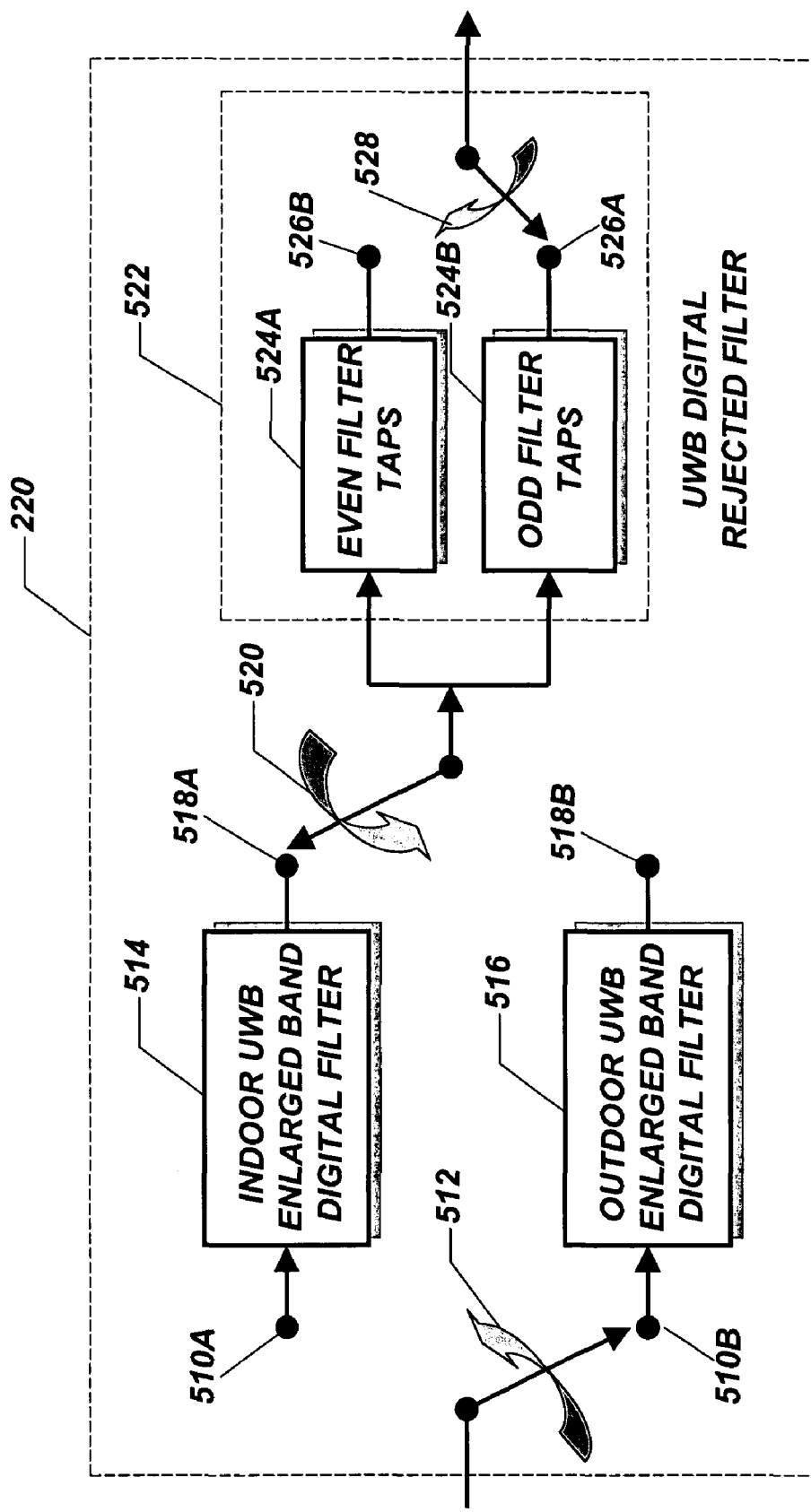
FIG. 5 is a block diagram showing one embodiment of a dual-mode digital transmission-shaping filters of the present invention.

A direct design of the indoor and outdoor digital FIR lowpass-shaping transmitter filters based on the indoor transmitter spectrum mask 320 and the outdoor transmitter spectrum mask 420 will lead to a huge number of filter taps. In order to reduce the number of filter taps of the digital FIR lowpass-shaping transmitter filters for the dual-mode UWB communication transmitter 200, an efficient design method 500 of the cascaded filters may be used as shown in FIG. 5. The results of the cascaded filters meet the requirements of the indoor transmitter spectrum mask 320 and the outdoor transmitter spectrum mask 420 while the number of filter taps of the digital FIR lowpass-shaping transmitter filters can be significantly reduced for the indoor and/or outdoor operations.

Referring to FIG. 5 is a block diagram showing a dual-mode digital FIR lowpass-shaping transmitter filter 500 for the indoor and outdoor dual-mode UWB communication transmitter according to some embodiments. During the indoor UWB transmitter mode, a switch 512 is connected to a position 510A and a switch 520 is connected with a position 518A. In this case, an indoor UWB enlarged band digital FIR filter 514 is cascaded with an UWB digital rejected FIR filter 522. The combination of the indoor UWB enlarged band digital FIR filter 514 and the UWB digital rejected FIR filter 522 can achieve an indoor transmitter function that meets the requirement of the transmitter spectrum mask 320 of the indoor power spectrum density 300 as shown in FIG. 3. On the other hand, during the outdoor UWB transmitter mode, the switch 512 is connected to a position 510B and the switch 520 is connected with a position 518B. In this case, the outdoor UWB enlarged band digital FIR filter 516 is cascaded with the UWB digital rejected FIR filter 522. The combination of the outdoor UWB enlarged band digital FIR filter 516 and the digital rejected FIR filter 522 can obtain an outdoor transmitter function that meets the requirements of the transmitter spectrum mask 420 of the outdoor power spectrum density 400 as shown in FIG. 4.

The UWB digital rejected FIR filter 522 as shown in FIG. 5 contains an even filter with even taps 524A and an odd filter with odd taps 524B. The switch 528 is connected with the position 526A (when n=0, 2, 4, . . . ) and is connected with the position 526B (when n=1, 3, 5, . . . , respectively. Thus, the even filter 524A and the odd filter 524B operate in parallel. This is equivalent to a polyphase implementation structure for an interpolation filter with up sampling by 2.

Figure 6:
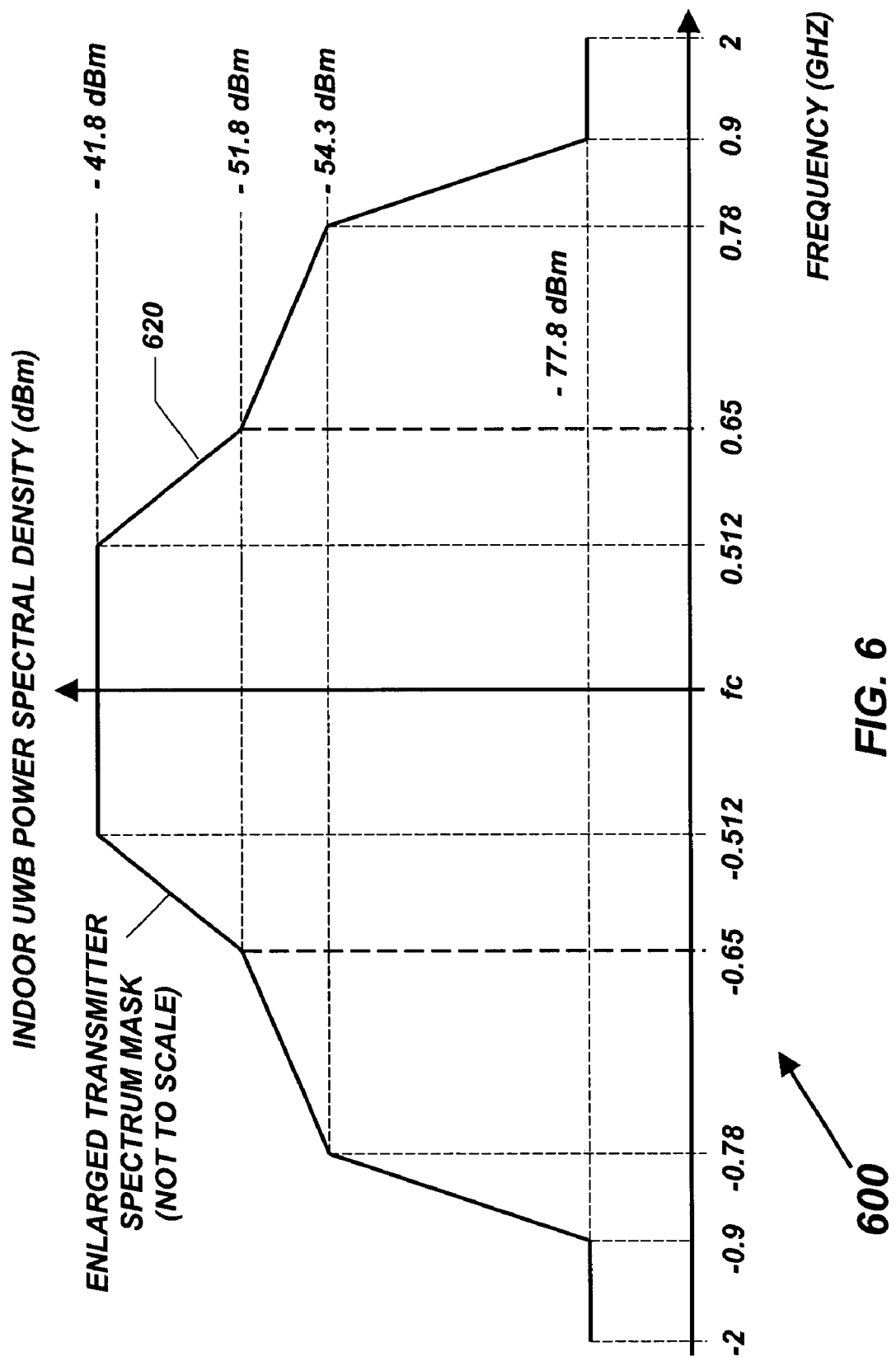
FIG. 6 is an enlarged transmitter spectrum mark of the indoor power spectrum density (dBm) according to some embodiments.

Referring to FIG. 6, which is an enlarged transmitter spectrum mark 620 of an indoor power spectral density 600 using for the indoor enlarged digital lowpass shaping FIR filter 514 of FIG. 5 according to some embodiments. The enlarged transmitter spectrum mark 620 is a double frequency bandwidth of the transmitter spectrum mask 320 of the indoor power spectrum density 300 as shown in FIG. 3. The magnitudes (dBm) of the frequency response of the enlarged transmitter filter with an error of $\pm\delta_i$(i=1, 2, 3, 4) according to the frequencies (GHz) are given by, $$(-41.8-\delta_1) \leq |H(f)| \leq (-41.8+\delta_1), |f-f_c| \leq 0.512, \quad (3)$$

$$|H(f)| \leq (-51.8+\delta_2), |f-f_c|=0.65, \quad (4)$$

$$|H(f)| \leq (-54.3+\delta_3), |f-f_c|=0.78, \quad (5)$$

$$|H(f)| \leq (-75.8+\delta_4), 0.9 \leq |f-f_c| \leq 2. \quad (6)$$

The enlarged transmitter spectrum mark 620 serves as a guide to design the indoor enlarged digital lowpass-shaping FIR transmitter filter 514 for the indoor UWB communication transmitter.

Figure 7:
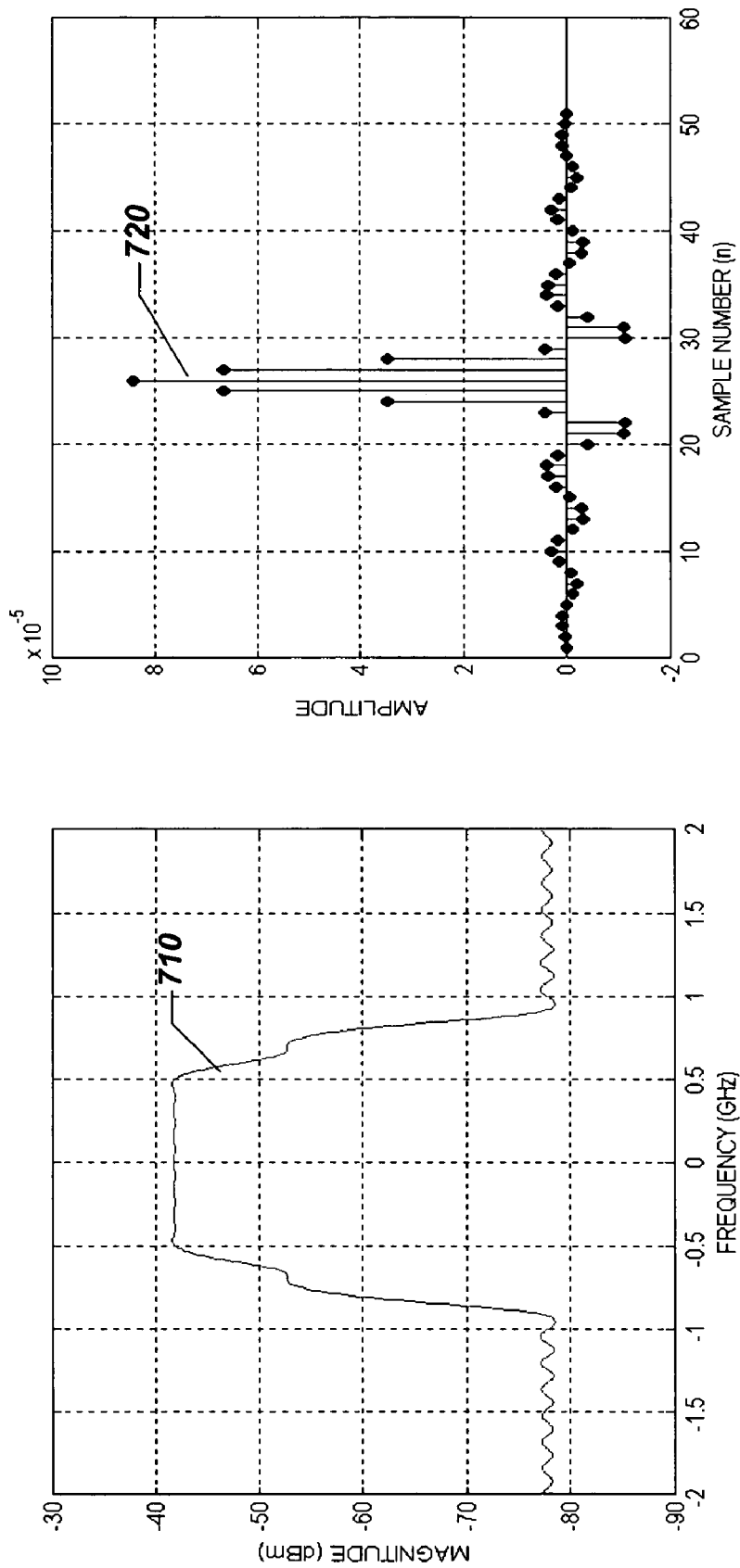
FIG. 7 is a frequency and impulse response of a digital enlarged transmission-shaping filter for the indoor operation according to one embodiment.

Referring to FIG. 7 is a frequency and impulse response 700 of the indoor digital enlarged lowpass-shaping FIR transmitter filter based on the enlarged transmitter spectrum mark 620 according to some embodiments. The impulse response 720 of the indoor digital enlarged lowpass-shaping FIR transmitter filter is an odd symmetric and linear phase with a total of 51 filter coefficients. Table 3 lists all the filter coefficients.

TABLE 3

| Coefficients | Value |
| --- | --- |
| h[0] | 8.4146443275983984e−005 |
| h[−1],h[1] | 6.6538759917782311e−005 |
| h[−2],h[2] | 3.4858868895304791e−005 |
| h[−3],h[3] | 4.1937291332765197e−006 |
| h[−4],h[4] | −1.1315071537226617e−005 |
| h[−5],h[5] | −1.1106740829476855e−005 |
| h[−6],h[6] | −3.9951396057640505e−006 |
| h[−7],h[7] | 1.7898880674583391e−006 |
| h[−8],h[8] | 3.8545744226485537e−006 |
| h[−9],h[9] | 3.5424465162252467e−006 |
| h[−10],h[10] | 2.0127906711873520e−006 |
| h[−11],h[11] | −4.4201040083757460e−007 |
| h[−12],h[12] | −2.8002950717915257e−006 |
| h[−13],h[13] | −3.2214448679624463e−006 |
| h[−14],h[14] | −1.0826918814367627e−006 |
| h[−15],h[15] | 1.8271797116557857e−006 |
| h[−16],h[16] | 2.9338389172971390e−006 |
| h[−17],h[17] | 1.4975933707645800e−006 |
| h[−18],h[18] | −8.3125861034249542e−007 |
| h[−19],h[19] | −1.9498085493385459e−006 |
| h[−20],h[20] | −1.3114239806658213e−006 |
| h[−21],h[21] | 2.8157753999354317e−008 |
| h[−22],h[22] | 8.5150911646371978e−007 |
| h[−23],h[23] | 8.4195702592509668e−007 |
| h[−24],h[24] | 4.1121891811157223e−007 |
| h[−25],h[25] | −1.9624930527271418e−008 |

The digital enlarged lowpass-shaping FIR transmitter filter 700 may be designed using the least square method with weighting function for each frequency band. Other techniques such as equiripple approximations and windowing may also be used.

The implementation output y[n] of the digital enlarged lowpass-shaping FIR transmitter filter with 51 odd symmetric coefficients can be expressed as, $$y[n] = \sum_{k=0}^{50} h[n]x[n-k], \quad (7)$$

where h[n] is a set of the digital enlarged lowpass-shaping FIR transmitter filter coefficients as shown in Table 3 and x[n] is a digital input signal. Since the digital enlarged lowpass-shaping FIR transmitter filter 700 has odd symmetric coefficients, the above equation (7) can be rewritten as $$y[n] = \sum_{k=0}^{24} h[n](x[n-k] + x[n-50+k]) + h[25]x[n-25]. \quad (8)$$

The equation (8) can be implemented with saving half filter taps for the computation. The computation complexity of implementing this digital enlarged lowpass-shaping FIR transmitter filter 700 in the equation (8) is 25 multiplications and 50 additions.

Figure 8:
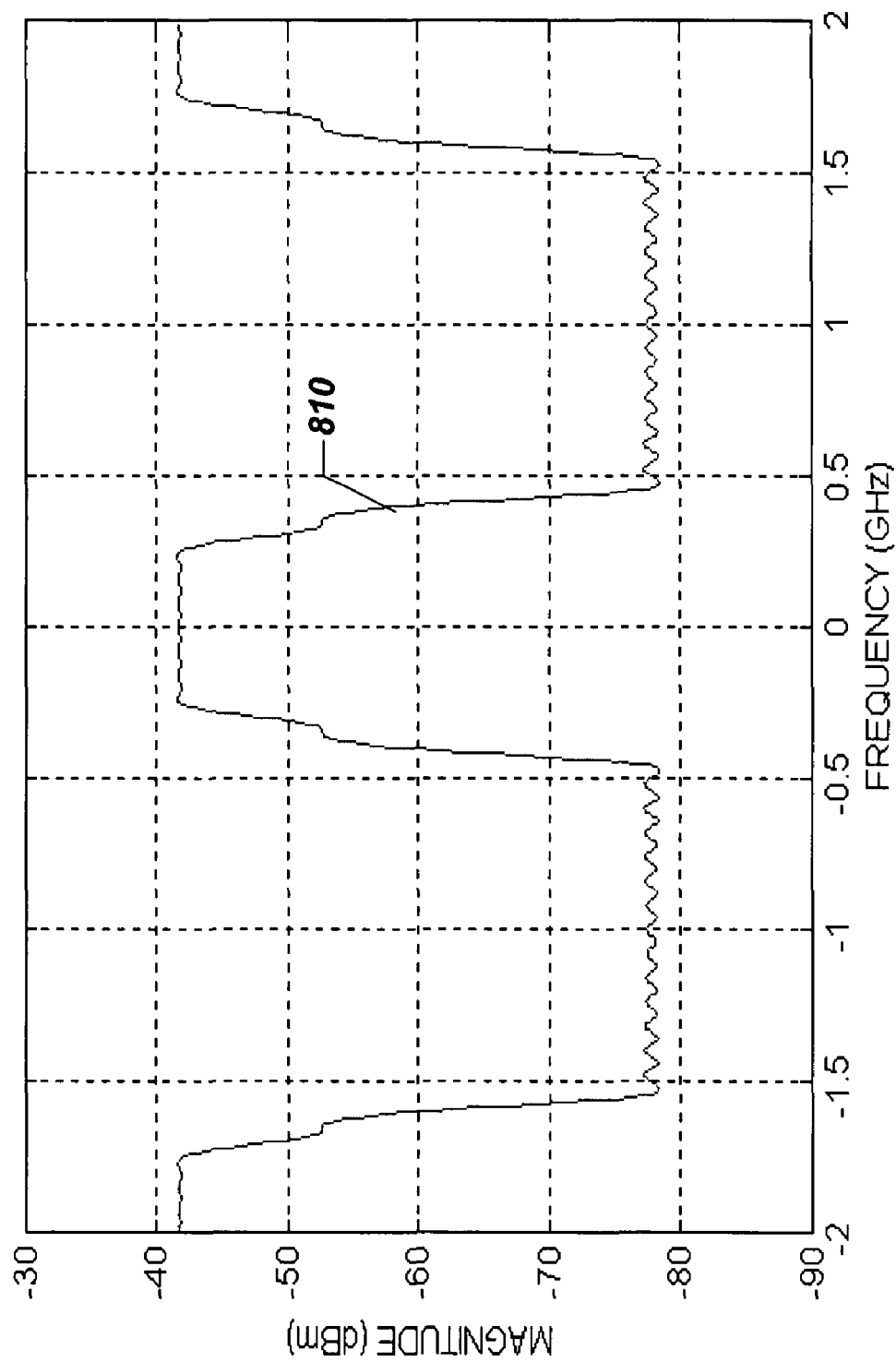
FIG. 8 is a frequency response of a multiband digital transmitter shaping finite impulse response (FIR) filter for the indoor operation according to one embodiment.

Referring to FIG. 8 is a frequency response 810 of the indoor multiband digital lowpass-shaping FIR transmitter filter 800 according to some embodiments. The multi-frequency bands in the FIR transmitter filter 800 are symmetric with the center frequency. This multiband digital lowpass-shaping FIR filter is created by inserting one zero in between every two filter coefficients of the indoor digital enlarged lowpass shaping FIR transmitter filter 720. This FIR transmitter filter is also referred to as the half-band FIR transmitter filter. Since the zero coefficients do not have computations with input samples, this indoor multiband digital lowpass-shaping FIR transmitter filter has the same as the computation complexities of the digital enlarged lowpass-shaping FIR transmitter filter 700. Thus, the computation complexity of the indoor multiband digital lowpass-shaping FIR transmitter filter 810 has also 25 multiplications and 50 additions.

Figure 9:
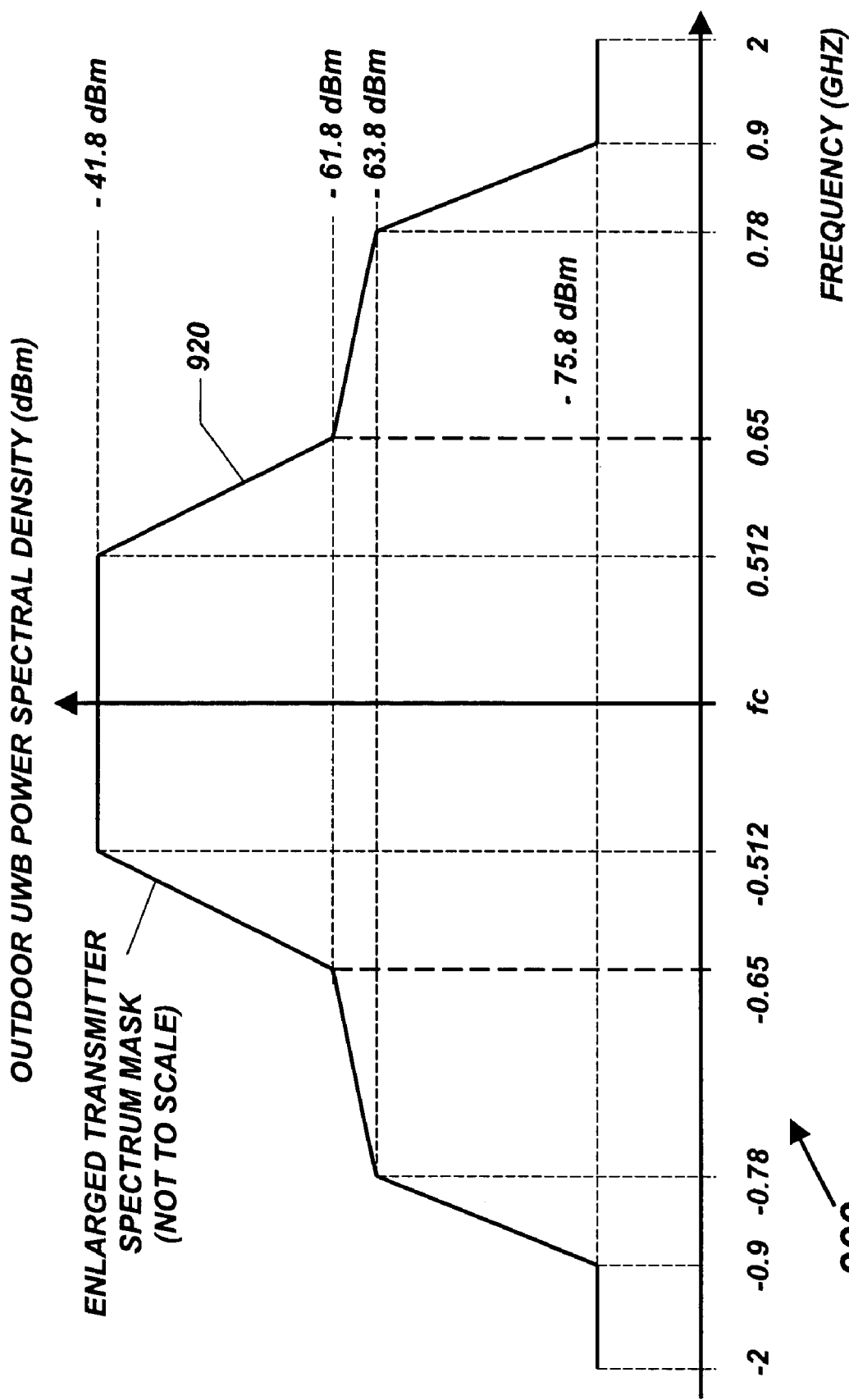
FIG. 9 is an enlarged transmitter spectrum mark of the outdoor power spectrum density (dBm) according to some embodiments.

Referring to FIG. 9, which is an enlarged transmitter spectrum mark 920 of the outdoor power spectral density 900 using for the outdoor digital enlarged lowpass-shaping FIR transmitter filter 516 of FIG. 5 according to some embodiments. The enlarged transmitter spectrum mark 920 is a double frequency bandwidth of the transmitter spectrum mask 420 of the outdoor power spectrum density 400 as shown in FIG. 4. The magnitudes (dBm) of the frequency response of the outdoor digital enlarged lowpass-shaping FIR transmitter filter with an error of $\pm\delta_i$ (i=1, 2, 3, 4) according to the frequencies (GHz) are given by, $$(-41.8-\delta_1) \leq |H(f)| \leq (-41.8+\delta_1), |f-f_c| \leq 0.512, \quad (3)$$

$$|H(f)| \leq (-61.8+\delta_2), |f-f_c| = 0.65, \quad (4)$$

$$|H(f)| \leq (-63.8+\delta_3), |f-f_c| = 0.78, \quad (5)$$

$$|H(f)| \leq (-75.8+\delta_4), 0.9 \leq |f-f_c| \leq 2. \quad (6)$$

The outdoor enlarged transmitter spectrum mark 920 serves as a guide to design an enlarged digital lowpass-shaping FIR transmitter filter for the outdoor UWB communication transmitter.

Figure 10:
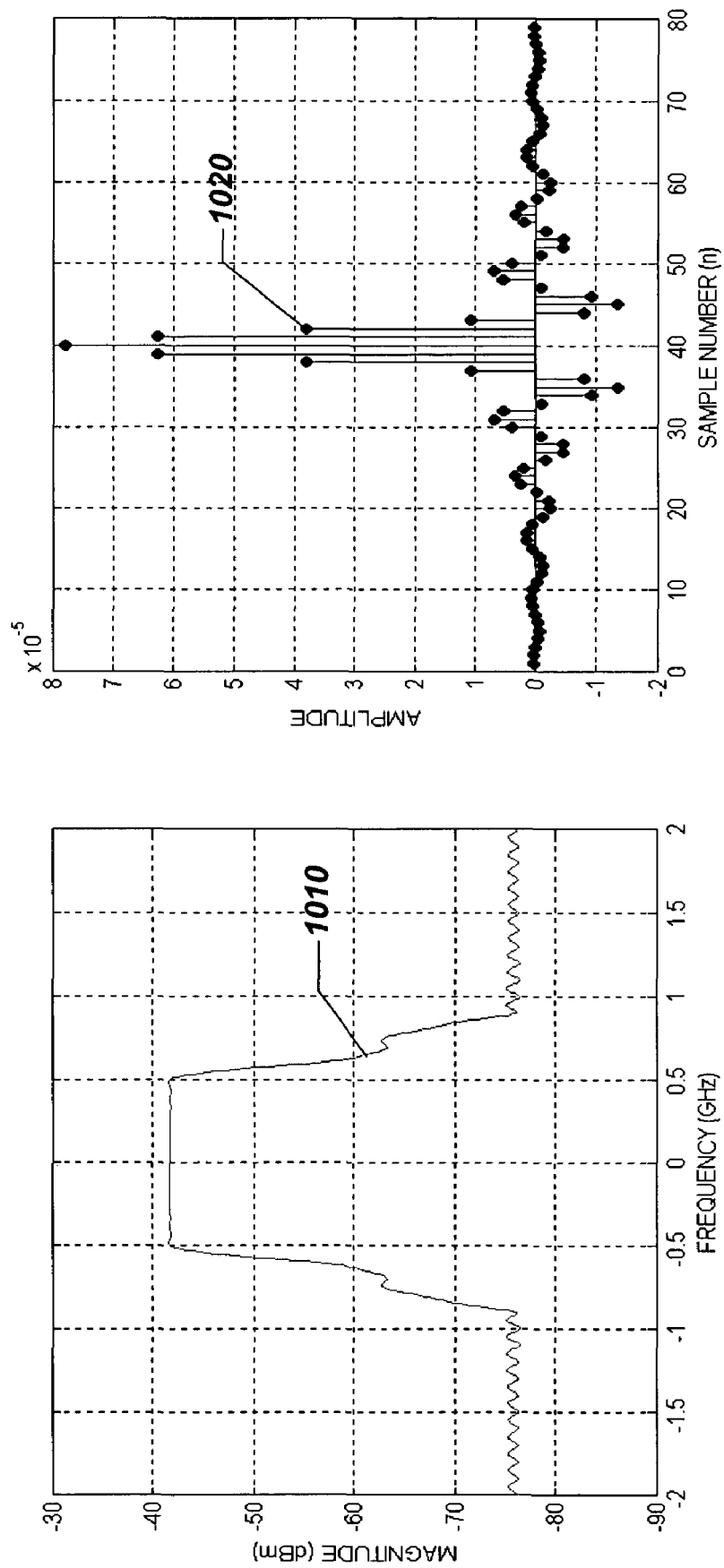
FIG. 10 is a frequency and impulse response of the digital enlarged transmission-shaping filter for the outdoor operation according to one embodiment.

Referring to FIG. 10 is a frequency and impulse response 1000 of the outdoor digital enlarged lowpass-shaping FIR transmitter filter based on the enlarged transmitter spectrum mark 920 according to some embodiments. The impulse response 1020 of the outdoor digital enlarged lowpass-shaping FIR transmitter filter is an odd symmetric and linear phase with a total of 79 filter coefficients. Table 4 lists all the outdoor filter coefficients.

TABLE 4

| Coefficients | Value |
| --- | --- |
| h[0] | 7.7822588092588666e−005 |
| h[−1],h[1] | 6.2706159538768121e−005 |
| h[−2],h[2] | 3.8005049828479667e−005 |
| h[−3],h[3] | 1.0741444546149776e−005 |
| h[−4],h[4] | −7.9100957139480000e−006 |
| h[−5],h[5] | −1.3617274449966842e−005 |
| h[−6],h[6] | −9.2282250841209486e−006 |
| h[−7],h[7] | −1.0206653104093280e−006 |
| h[−8],h[8] | 5.3549249436944863e−006 |
| h[−9],h[9] | 6.9957089527049026e−006 |
| h[−10],h[10] | 4.0766726365610294e−006 |
| h[−11],h[11] | −8.5812938269354714e−007 |
| h[−12],h[12] | −4.4365447822251048e−006 |
| h[−13],h[13] | −4.5122012631596486e−006 |
| h[−14],h[14] | −1.5288162010848101e−006 |
| h[−15],h[15] | 1.9977031110803787e−006 |
| h[−16],h[16] | 3.5384682976304697e−006 |

TABLE 4-continued

| Coefficients | Value |
|---|---|
| h[−17],h[17] | 2.4119472792416439e−006 |
| h[−18],h[18] | −8.0059122411445323e−008 |
| h[−19],h[19] | −1.9997685118910229e−006 |
| h[−20],h[20] | −2.2569595576355567e−006 |
| h[−21],h[21] | −1.0715363497847361e−006 |
| h[−22],h[22] | 5.2554956470109584e−007 |
| h[−23],h[23] | 1.5115571787722744e−006 |
| h[−24],h[24] | 1.4266179588856210e−006 |
| h[−25],h[25] | 4.9809052324633844e−007 |
| h[−26],h[26] | −5.9066254728929235e−007 |
| h[−27],h[27] | −1.1634171626619683e−006 |
| h[−28],h[28] | −9.4184481631453274e−007 |
| h[−29],h[29] | −1.7852893130696073e−007 |
| h[−30],h[30] | 5.8326059832774108e−007 |
| h[−31],h[31] | 8.7972213415469824e−007 |
| h[−32],h[32] | 5.9785566708851024e−007 |
| h[−33],h[33] | −1.4101683384769071e−010 |
| h[−34],h[34] | −5.0807887510975745e−007 |
| h[−35],h[35] | −6.2137237941119729e−007 |
| h[−36],h[36] | −3.5990788197097831e−007 |
| h[−37],h[37] | 5.0087020176186946e−008 |
| h[−38],h[38] | 3.0946891600984111e−007 |
| h[−39],h[39] | 3.3329123246466921e−007 |

Figure 11:
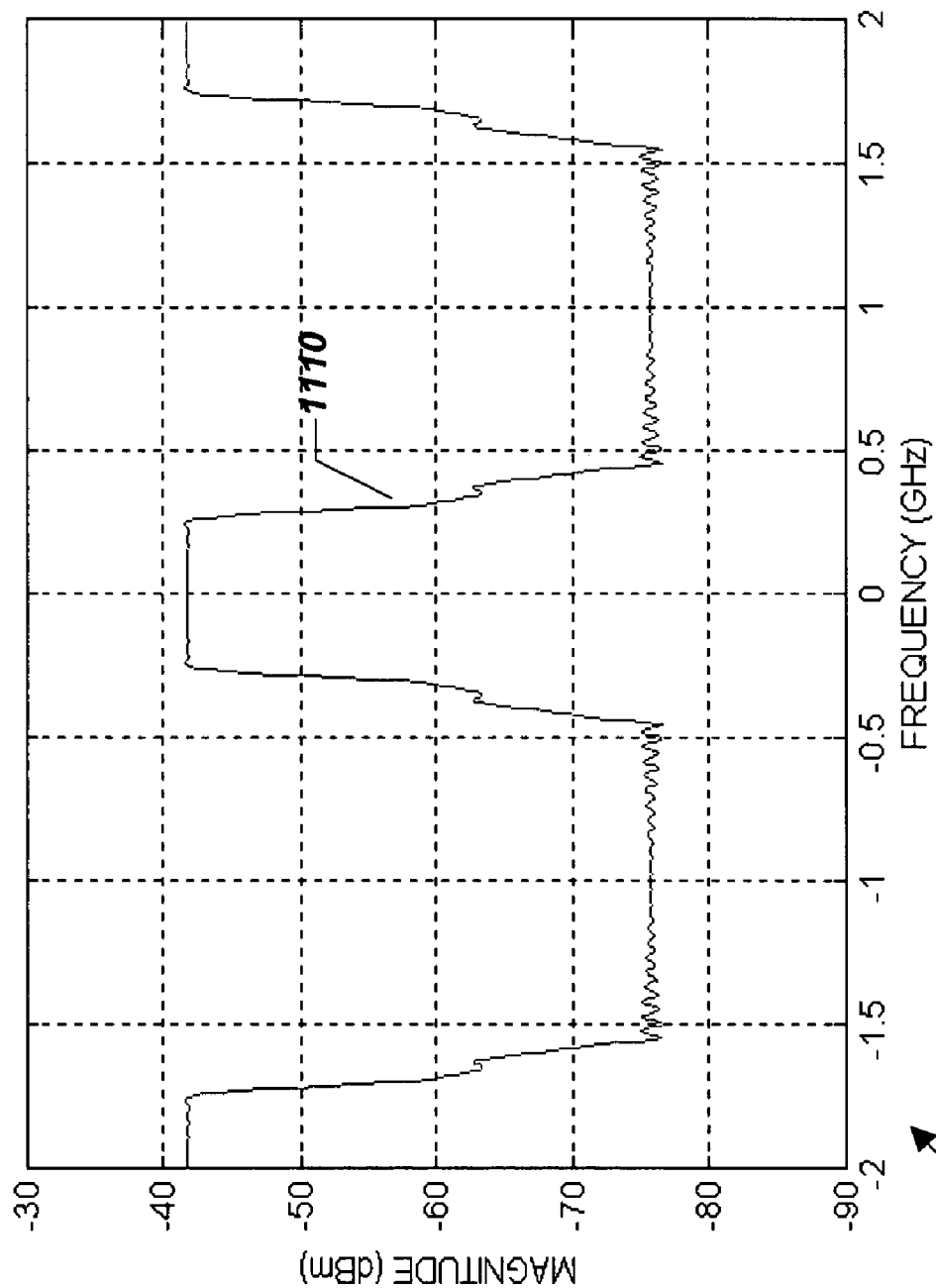
FIG. 11 is a frequency response of the multiband digital transmitter shaping FIR filter for the outdoor operation according to one embodiment.

Referring to FIG. 11 is a frequency response 1110 of the outdoor multiband digital lowpass-shaping FIR transmitter filter 1100 according to some embodiments. The multi-frequency bands of the FIR transmitter filter 1100 are symmetric with the center frequency. This multiband digital lowpass-shaping FIR transmitter filter 1110 is created by inserting one zero in between every two filter coefficients of the outdoor digital enlarged lowpass-shaping FIR transmitter filter 1020. This multiband digital lowpass-shaping FIR transmitter filter 1110 is also referred to as a half-band digital lowpass-shaping FIR transmitter filter. Since the zero coefficients do not have computations with input samples, this outdoor multiband digital lowpass-shaping FIR transmitter filter 1110 has the same as the computation complexities of the digital enlarged lowpass-shaping FIR transmitter filter 1000. Thus, the computation complexity of the outdoor multiband digital lowpass-shaping FIR transmitter filter 1100 has 39 multiplications and 78 additions.

Figure 12:
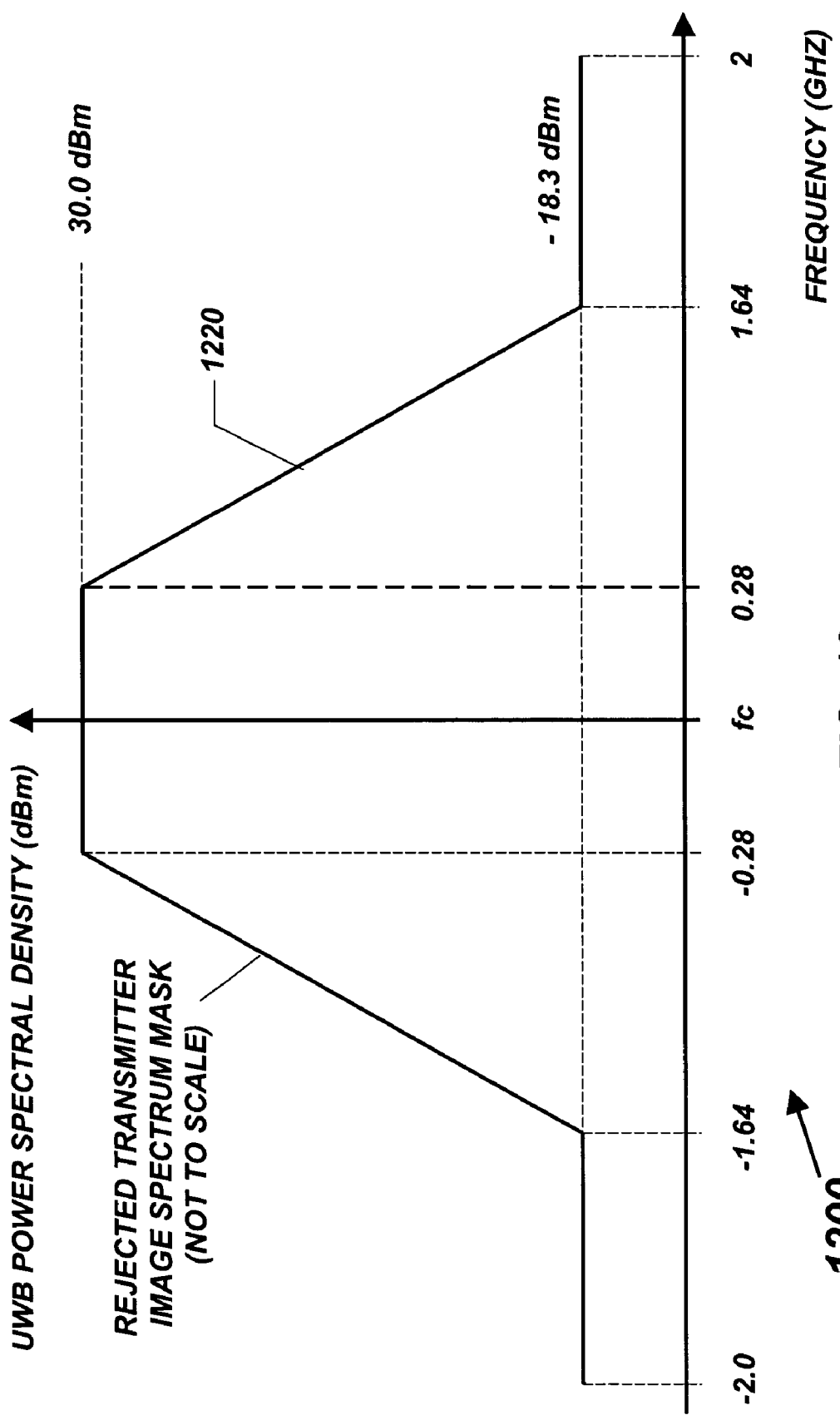
FIG. 12 is a rejected transmitter image spectrum mark using in both of the indoor and outdoor operations according to some embodiments.

FIG. 12 is a rejected transmitter image spectrum mark 1220 of a power spectral density 1200 using to eliminate the image bands of the indoor and outdoor digital multiband lowpass-shaping FIR transmitter filters 810 and 1110 according to some embodiments. The magnitudes (dBm) of the frequency response of the rejected transmitter image spectrum mask 1220 with an error of $\pm\delta_i(i=1,2)$ according to the frequencies (GHz) are given by, $$(30.0-\delta_1) \leq |H(f)| \leq (30+\delta_1), |f-f_c| \leq 0.28, \quad (3)$$

$$|H(f)| \leq (-18.3+\delta_2), 1.64 \leq |f-f_c| \leq 2. \quad (6)$$

The rejected transmitter image spectrum mark 1200 serves as a guide to design the UWB digital rejected filter 522 as shown in FIG. 5.

Figure 13:
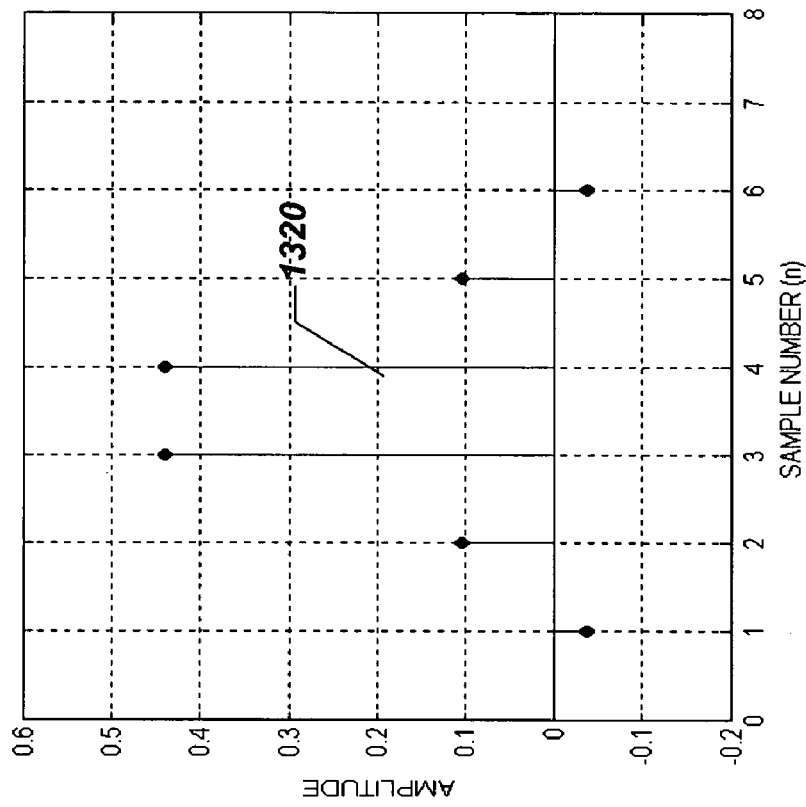
FIG. 13 is a frequency and impulse response of a digital rejected transmitter image filter according to one embodiment.
Figure 13:
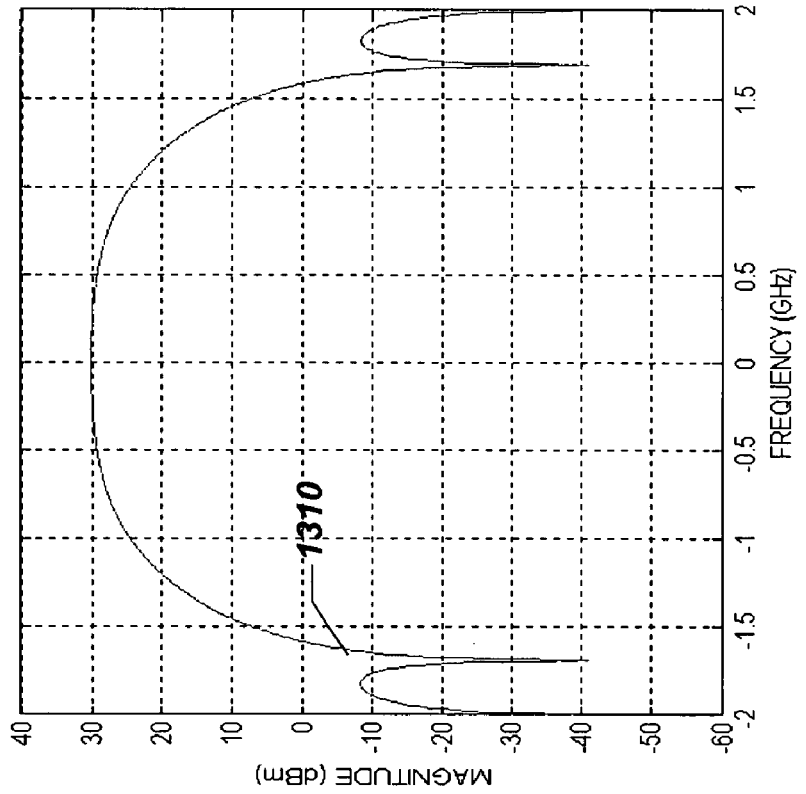

Referring to FIG. 13 is a frequency and impulse response of digital rejected lowpass FIR transmitter filter 1300 based on the rejected transmitter image spectrum mask 1220 according to some embodiments. The impulse response 1320 of the digital rejected lowpass FIR transmitter filter has an even symmetric coefficients and linear phase with a total of 6 filter coefficients. The computation complexity of this digital rejected lowpass FIR transmitter filter is 3 multiplications and 5 additions. Table 5 lists all of the digital rejected lowpass FIR transmitter filter coefficients.

| Coefficients | Value |
|---|---|
| h[−1],h[1] | 4.3847963307982163e−001 |
| h[−2],h[2] | 1.0531756617949097e−001 |
| h[−3],h[3] | −3.7781557560682605e−002 |

Figure 14:
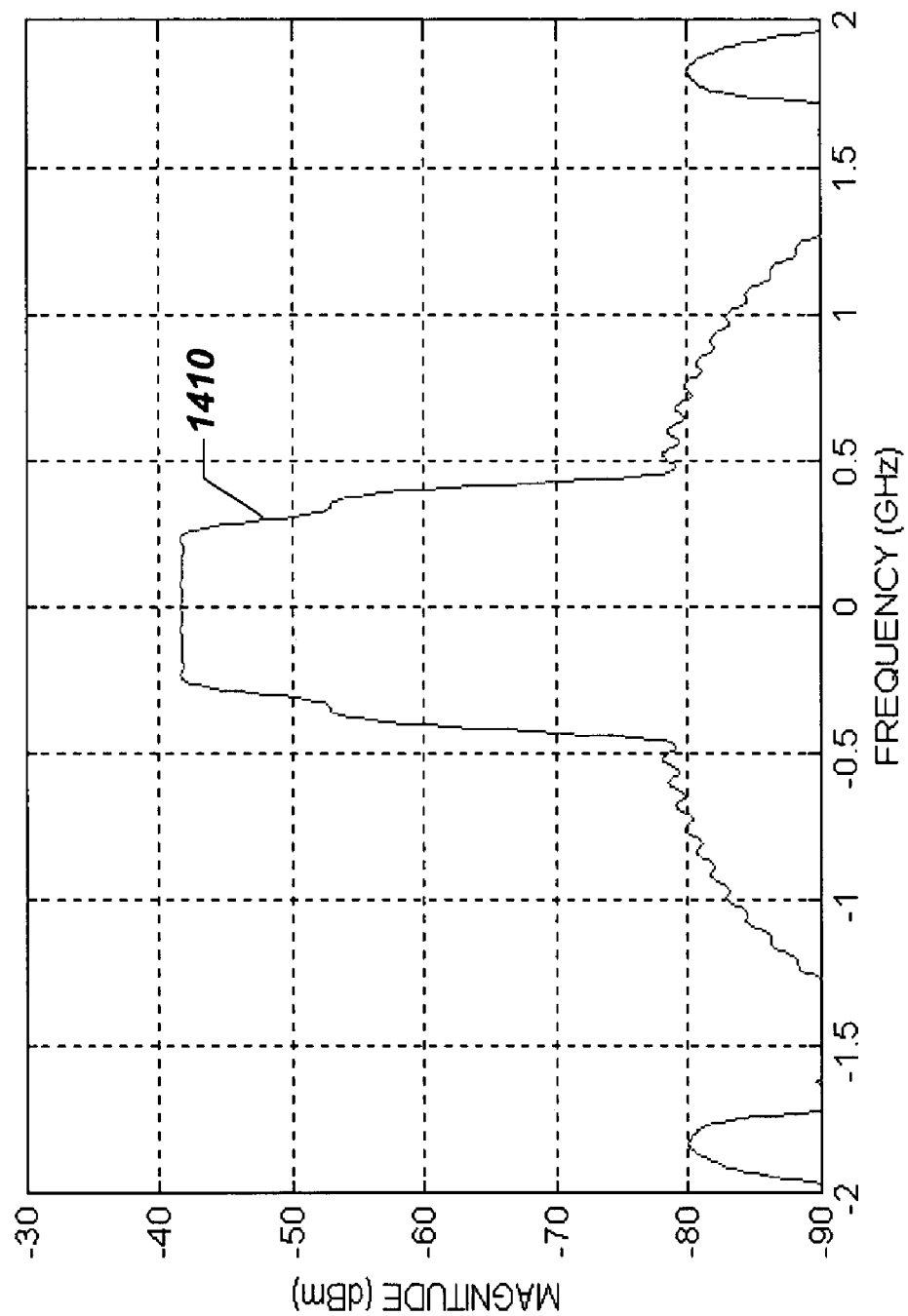
FIG. 14 is a frequency response showing a cascaded result of the indoor multiband digital transmitter shaping FIR filter and the digital rejected transmitter image filter according to one embodiment.

Referring to FIG. 14 is a frequency response of an indoor combination digital FIR transmitter filter 1410 by cascading the indoor digital enlarged lowpass-shaping FIR transmitter filter 810 and the digital rejected lowpass FIR transmitter filter 1310. The result of this combination digital FIR transmitter filter 1410 exactly meets the requirement of the transmitter spectrum mask 320 of the indoor power spectrum density 300 in FIG. 3.

Figure 15:
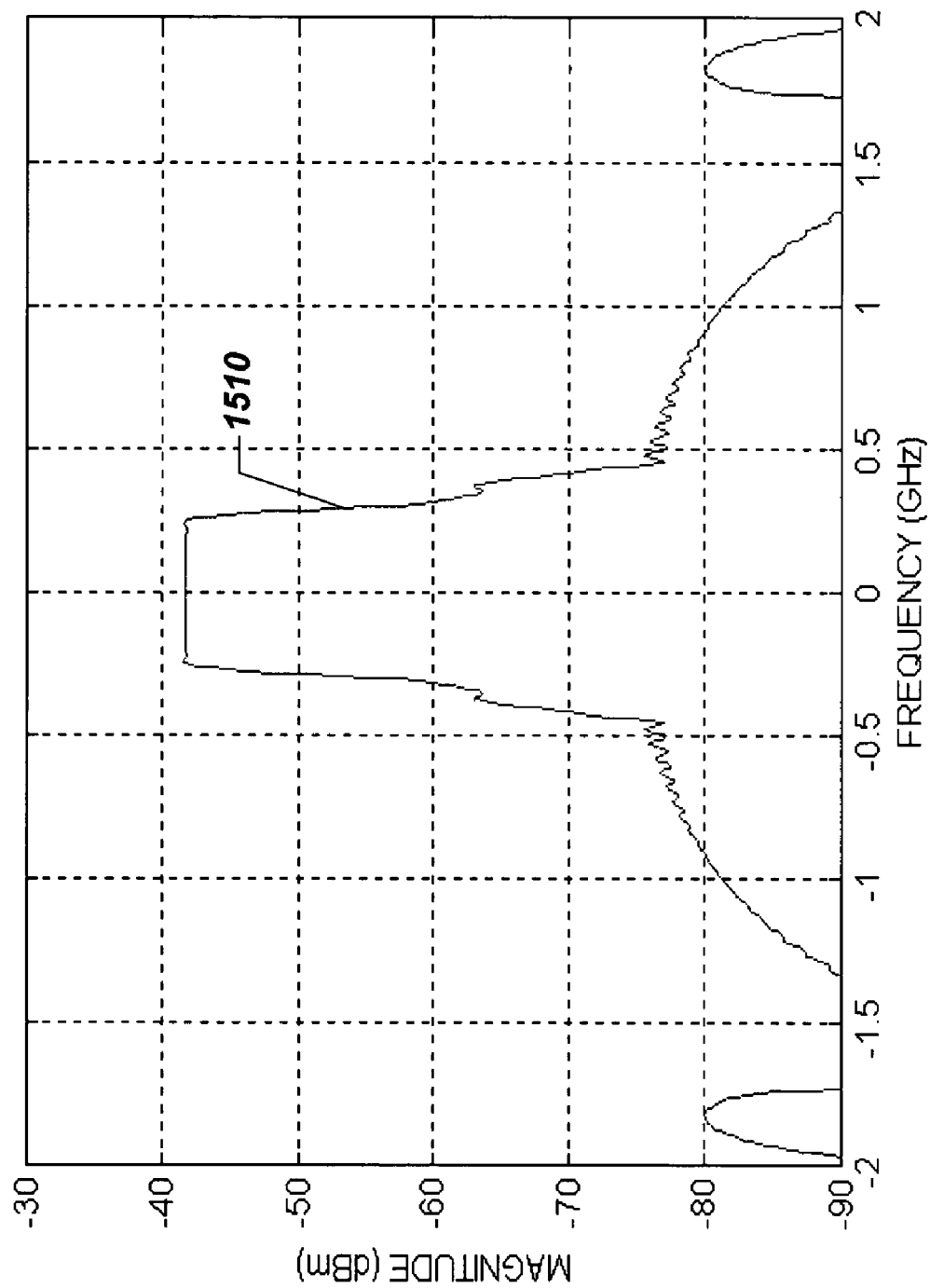
FIG. 15 is a frequency response showing a cascaded result of the outdoor multiband digital transmitter shaping FIR filter and the digital rejected transmitter image filter according to one embodiment.

Referring to FIG. 15 is a frequency response of the outdoor combination digital FIR transmitter filter 1510 by cascading the outdoor digital enlarged lowpass-shaping FIR transmitter filter 1110 and the digital rejected lowpass FIR transmitter filter 1310. The result of this outdoor combination digital FIR transmitter filter 1510 exactly meets the requirements of the transmitter spectrum mask 420 of the outdoor power spectrum density 400 in FIG. 4.

Figure 16:
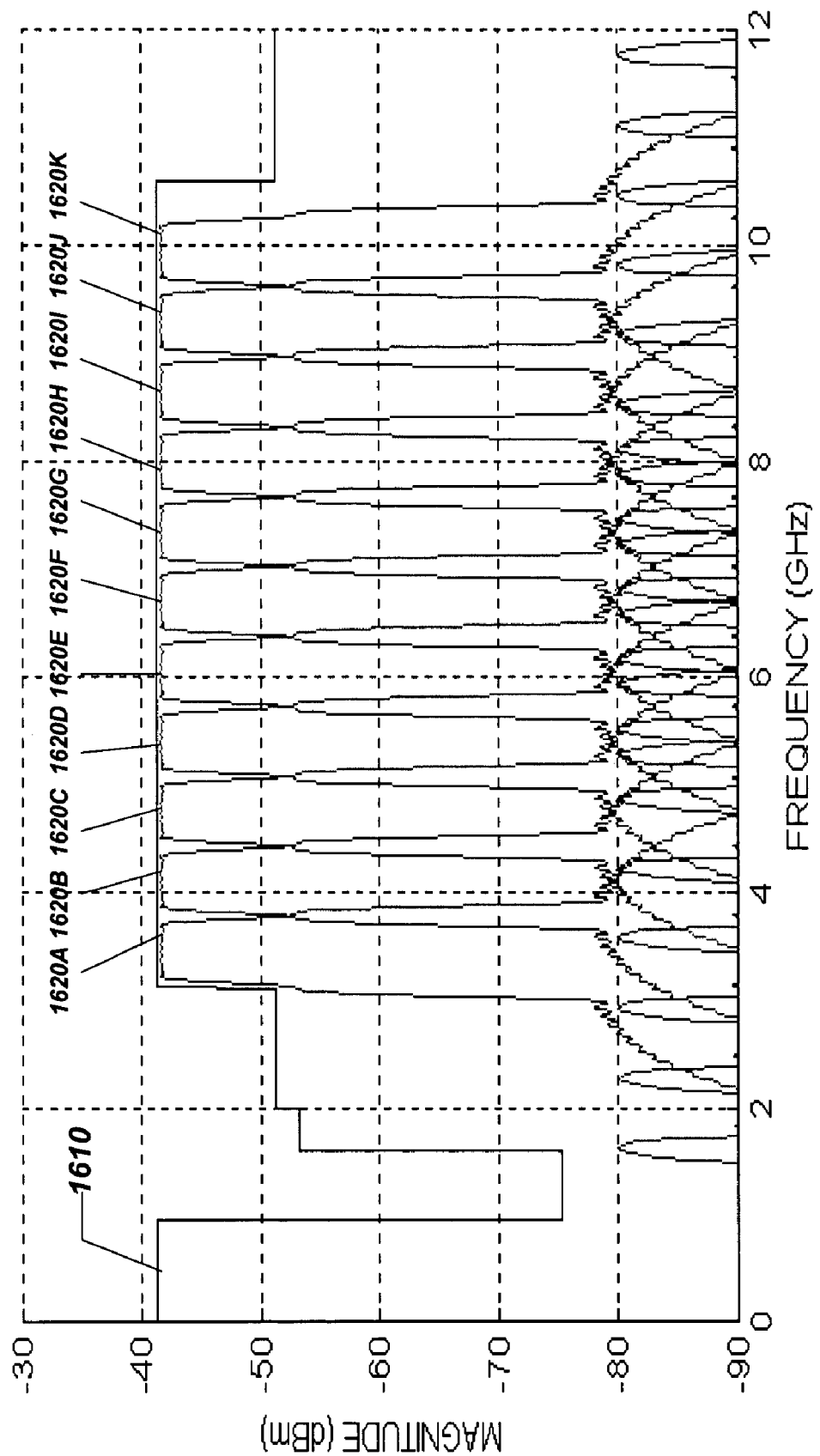
FIG. 16 is a frequency spectrum including 11 transmitter channel spectrums for the indoor operation along with the indoor FCC emission mask limitation according to some embodiments.

FIG. 16 is an indoor output of multi-carrier frequency spectrums (dBm) 1600 including 11 transmitter channel spectrums 1620A–1620K along with the indoor FCC emission limitation 1610 according to some embodiments. Each channel frequency bandwidth is 650 MHz and is fitted under the indoor FCC emission limitation 1610 with different carrier frequencies. The detail positions of each transmitter channel spectrums (dBm) along with the center, lower, and upper frequencies (GHz) as well as channel frequency bandwidths (MHz) are listed in Table 6.

TABLE 6

| Label of transmitter channel frequency spectrums | Center Frequency (GHz) | Lower Frequency (GHz) | Upper Frequency (GHz) | Frequency Bandwidth (MHz) |
|---|---|---|---|---|
| 1620A | 3.45 | 3.125 | 3.775 | 650 |
| 1620B | 4.10 | 3.775 | 4.425 | 650 |
| 1620C | 4.75 | 4.425 | 5.075 | 650 |
| 1620D | 5.40 | 5.075 | 5.725 | 650 |
| 1620E | 6.05 | 5.725 | 6.375 | 650 |
| 1620F | 6.70 | 6.375 | 7.025 | 650 |
| 1620G | 7.35 | 7.025 | 7.675 | 650 |
| 1620H | 8.00 | 7.675 | 8.325 | 650 |
| 1620I | 8.65 | 8.325 | 8.975 | 650 |
| 1620J | 9.30 | 8.975 | 9.625 | 650 |
| 1620K | 9.95 | 9.625 | 10.275 | 650 |

Figure 17:
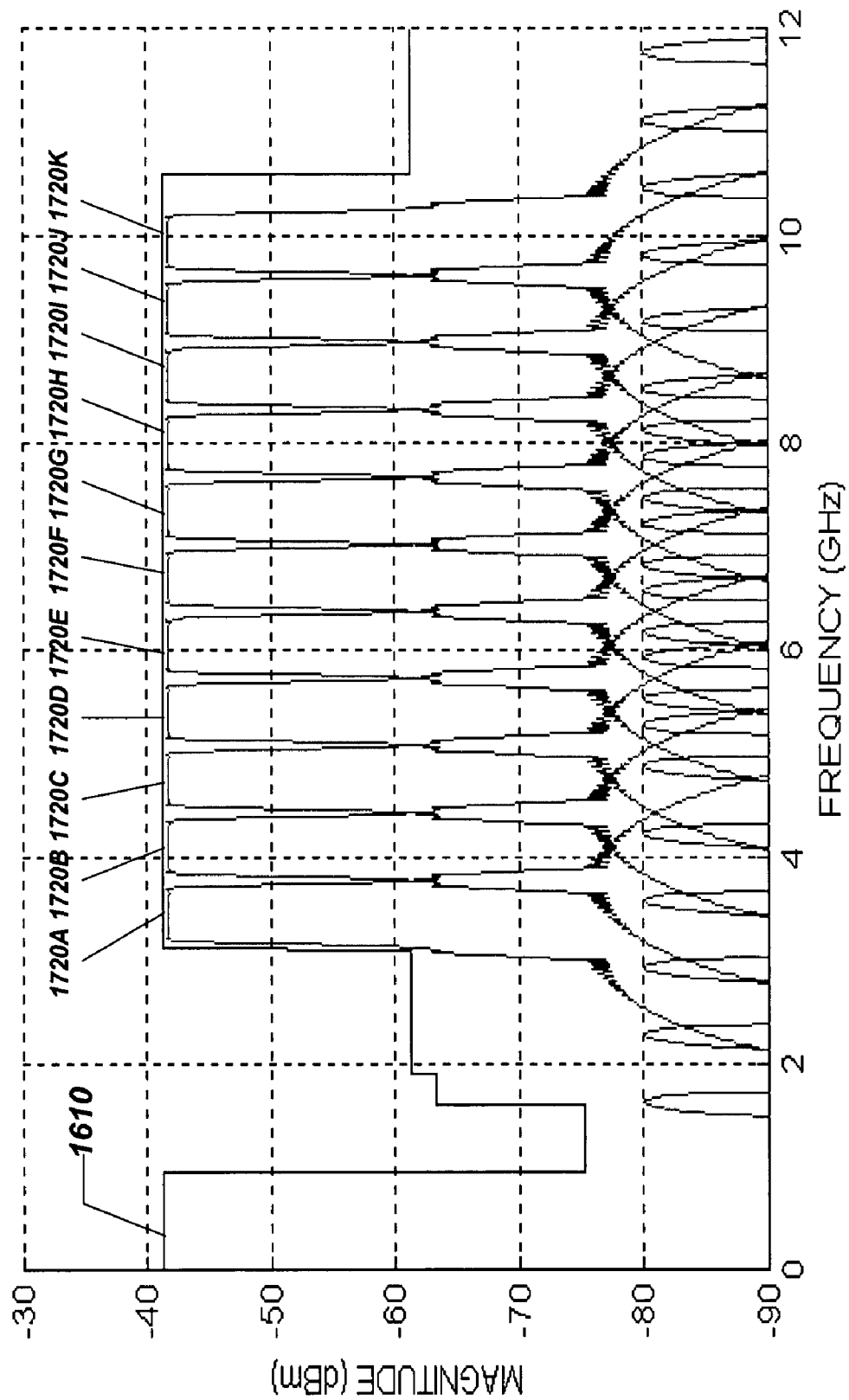
FIG. 17 is a frequency spectrum including 11 transmitter channel spectrums for the outdoor operation along with the outdoor FCC emission mask limitation according to some embodiments.

FIG. 17 is an outdoor output of multi-carrier frequency spectrums (dBm) 1700 including 11 transmitter channel spectrums 1720A–1720K along with the outdoor FCC emission limitation 1610 according to some embodiments. Each channel frequency bandwidth is 650 MHz and is fitted under the outdoor FCC emission limitation 1610 with different carrier frequencies. The detail positions of each transmitter channel spectrums (dBm) along with the center, lower, and upper frequencies (GHz) as well as channel frequency bandwidths (MHz) are the same as values listed in Table 6.

Figure 18:
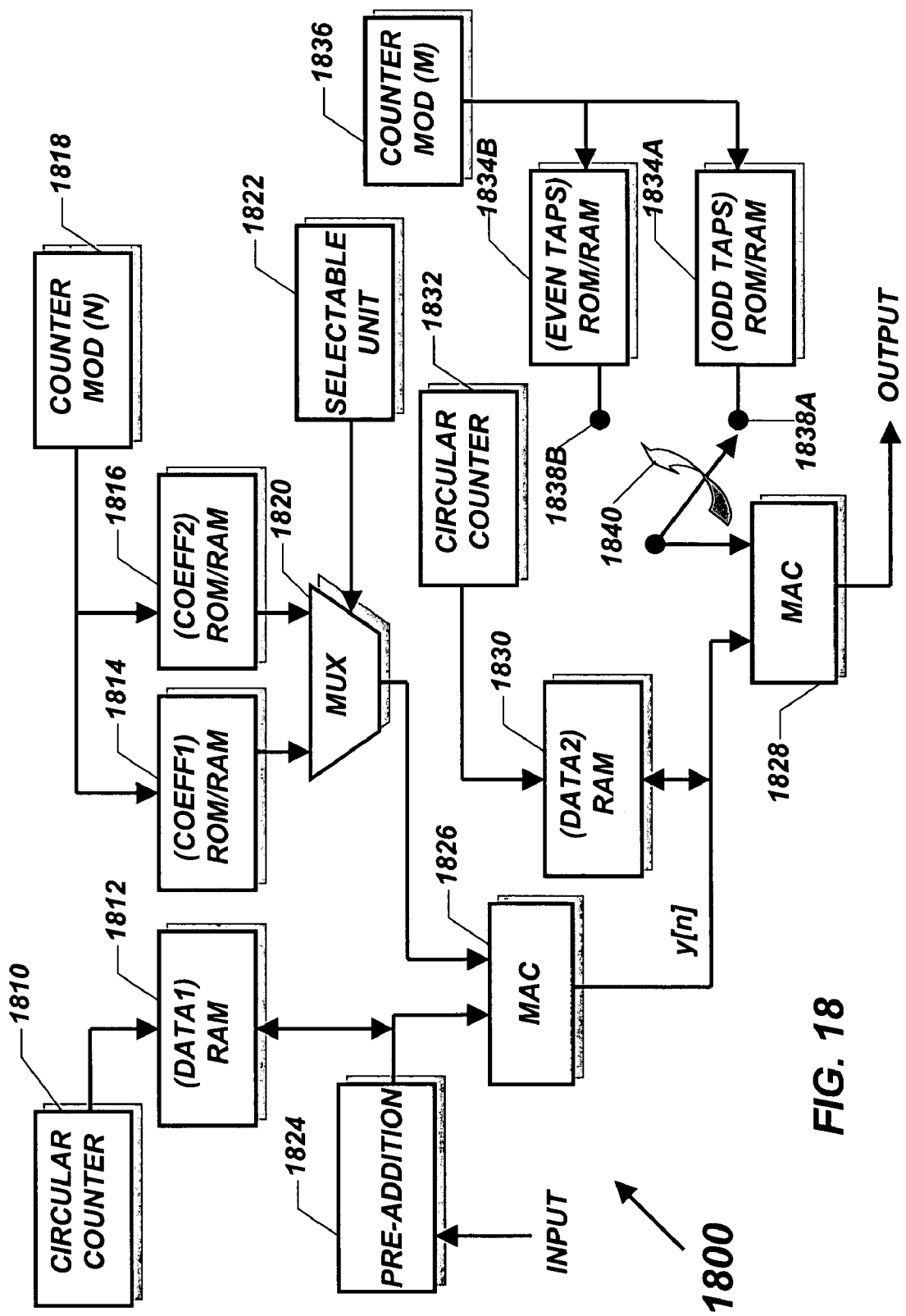
FIG. 18 is a block diagram showing a dual-mode architecture of the digital transmitter-shaping FIR filter for the indoor and outdoor operations according to some embodiments.

FIG. 18 is a block diagram showing the dual-mode architecture of the digital lowpass-shaping FIR transmitter filters for indoor and outdoor operations according to some embodiments. Six different memory banks 1812, 1814, 1816, 1830, 1834A and 1834B are used. Four memory banks 1814, 1816, 1834A and 1834B, which may be Read-Only- Memory (ROM) for single-purpose filters or Random-Access-Memory (RAM) for programmable filters, are dedicated to the filter coefficients that are fixed in values during the indoor and/or outdoor operations. The memory bank 1814 contains the indoor digital enlarged lowpass-shaping FIR transmitter filter coefficients 720. The memory bank 1816 includes the outdoor digital enlarged lowpass-shaping FIR transmitter filter coefficients 1020. The memory banks 1834A and 1834B store even and odd filter coefficients of the digital rejected lowpass FIR transmitter filter 1320, respectively. The other memory banks 1812 and 1830 are data memory such as RAM to set aside for the input samples. The data memory banks 1812 and 1830 act as a circular buffer operation.

The input samples are passed through a pre-addition 1824 to perform a symmetric addition operation. The output samples of the pre-addition 1824 are stored into the data memory bank 1812 with a circular buffer operation by controlling of a circular counter 1810. A selectable unit 1822 controls a multiplexer (MUX) unit 1820 to select either the memory bank 1814 or the memory bank 1816 with a counter modular 1818. The selected memory bank, either the memory bank 1814 or the memory bank 1816, operates with the input samples in the data memory bank 1812 by using a multiply and accumulate (MAC) unit 1826 to produce the filter output y[n]. Then the output samples y[n] are stored into the data memory bank 1830. A switch 1840 connects to the position 1838A when n=0, 2, 4, ..., and connects to the position 1838B when n=1, 3, 5, .... Thus, the input samples of the data memory bank 1830 with a circular counter 1832 are multiplied and accumulated with the memory banks 1834A and 1834B of the even and odd digital rejected FIR transmitter filter coefficients with a counter modular 1836 to produce the output by using a MAC unit 1828.

Figure 19:
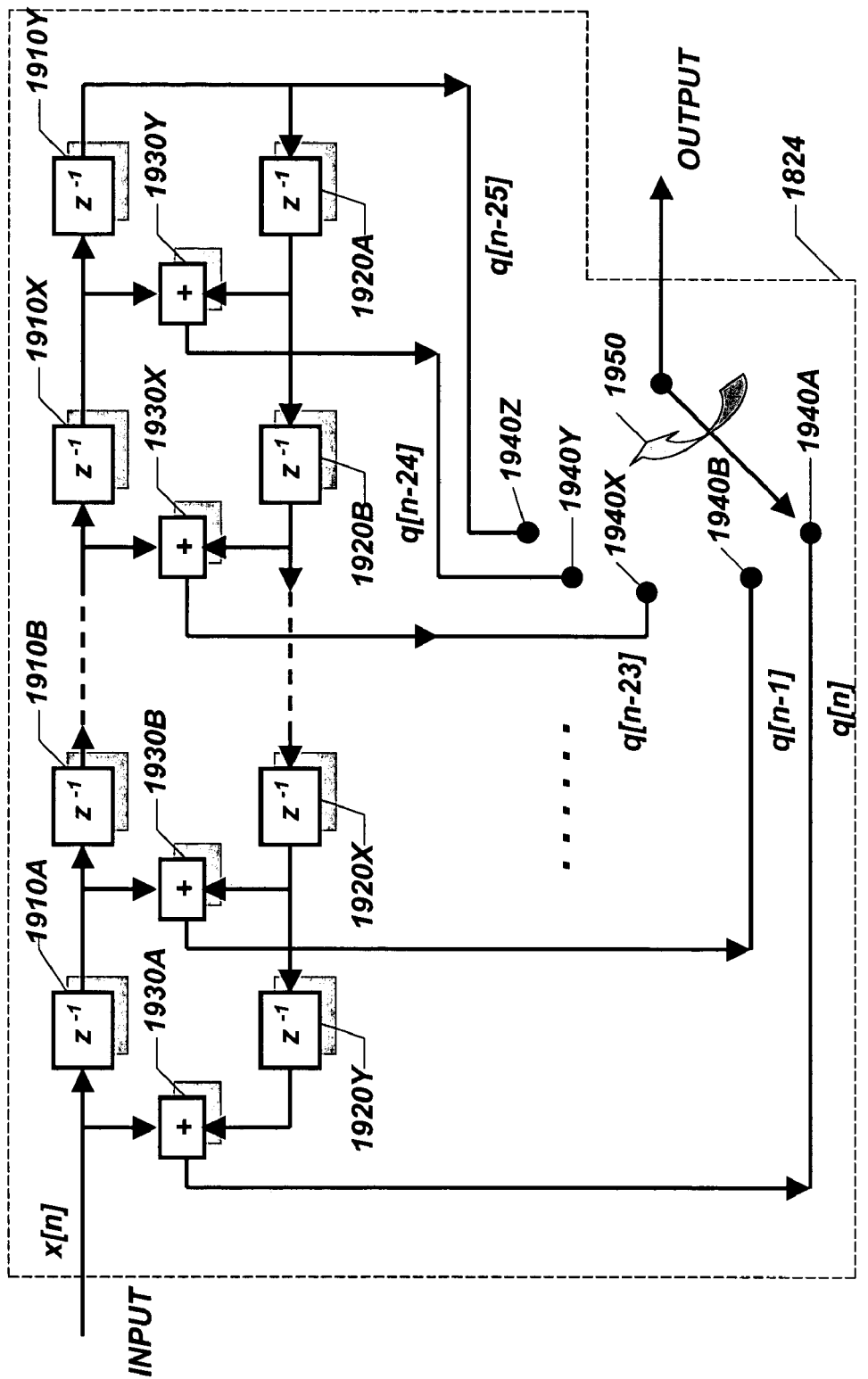
FIG. 19 is a block diagram showing a pre-addition architecture using in the dual-mode digital transmitter-shaping filter with the indoor and outdoor operations according to some embodiments.

Referring to FIG. 19, which is a detailed block diagram 1900 showing one embodiment of the pre-addition unit 1824 of the present invention. The units 1910A–1910Y and units 1920A–1920Y are called one sample delay unit. There are a total of 50 sample delay units. The units 1930A–1930Y are referred to as an addition operation unit. There are a total of 25 addition operation units. The input samples x[n] are passed through the delay and addition operation units to produce output samples as follows:

$$q[n-k]=x[n-k]+x[n-50+k], \text{ for } k=0, 1, 2, \ldots, 24.$$

$$q[n-k]=x[n-k], \text{ for } k=25.$$

Then, a switch 1950 sequentially connects to the positions 1940A–1940Y until the last sample is finished. Thus, the pre-addition unit 1900 may achieve a pre-addition calculation for the input samples that are used to reduce computations when the output samples q[n] are multiplied with the odd symmetric filter coefficients.

Figure 20:
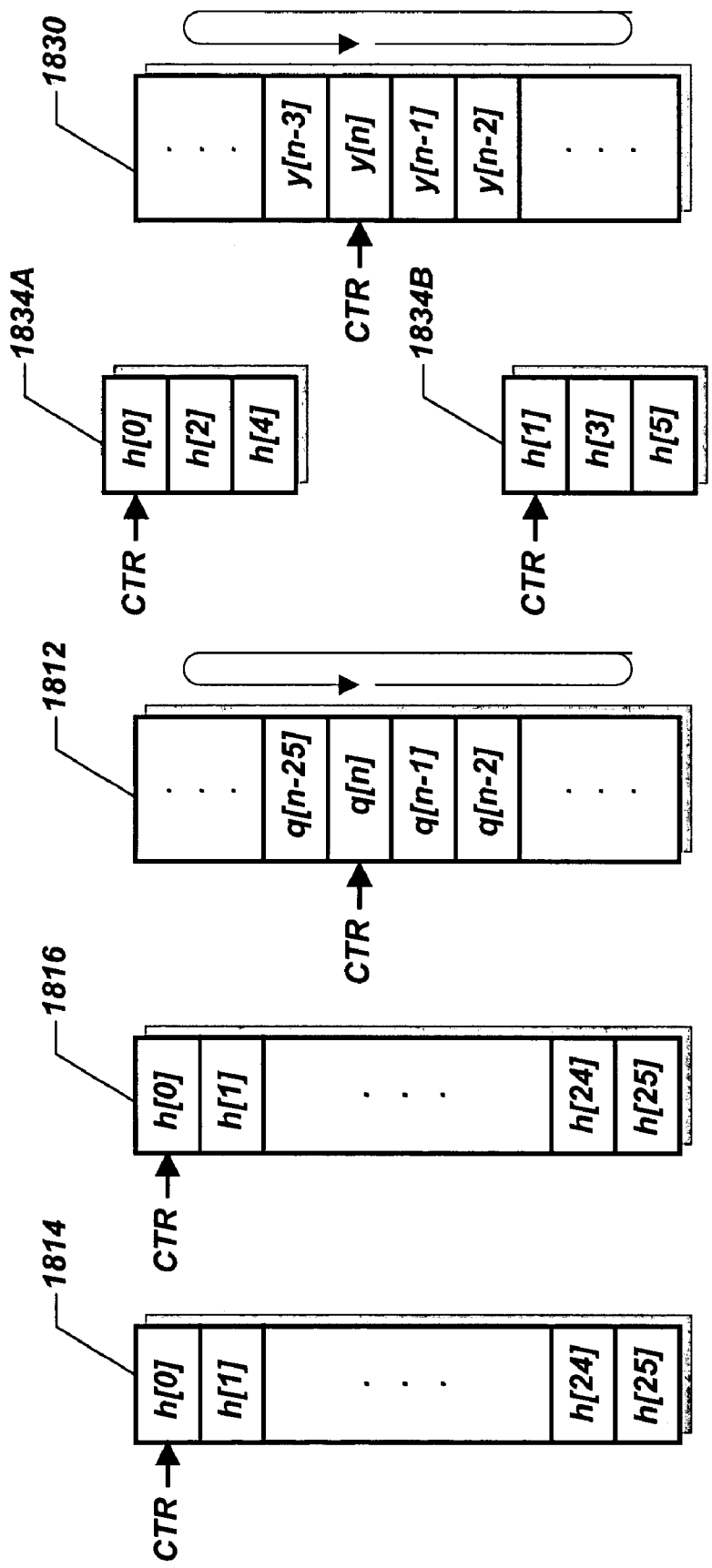
FIG. 20 is a block diagram showing memory structures that contain transmission filter coefficients and input samples.

Referring to FIG. 20, which is a detailed block diagram 2000 showing the filter coefficient memory banks and the data memory banks. The memory banks 1814 and 1816 contain the indoor digital enlarged lowpass-shaping FIR transmitter filter coefficients 720 and the outdoor digital enlarged lowpass-shaping FIR transmitter filter coefficients 1020, with a counter modular. The data memory bank 1812 contains the input data samples, with the circular counter. The memory banks 1834A and 1834B include the even and odd filter coefficients of the digital rejected FIR transmitter filter 1320, with the counter modular. The data memory bank 1830 contains the input data samples, with the circular counter.

Figure 21:
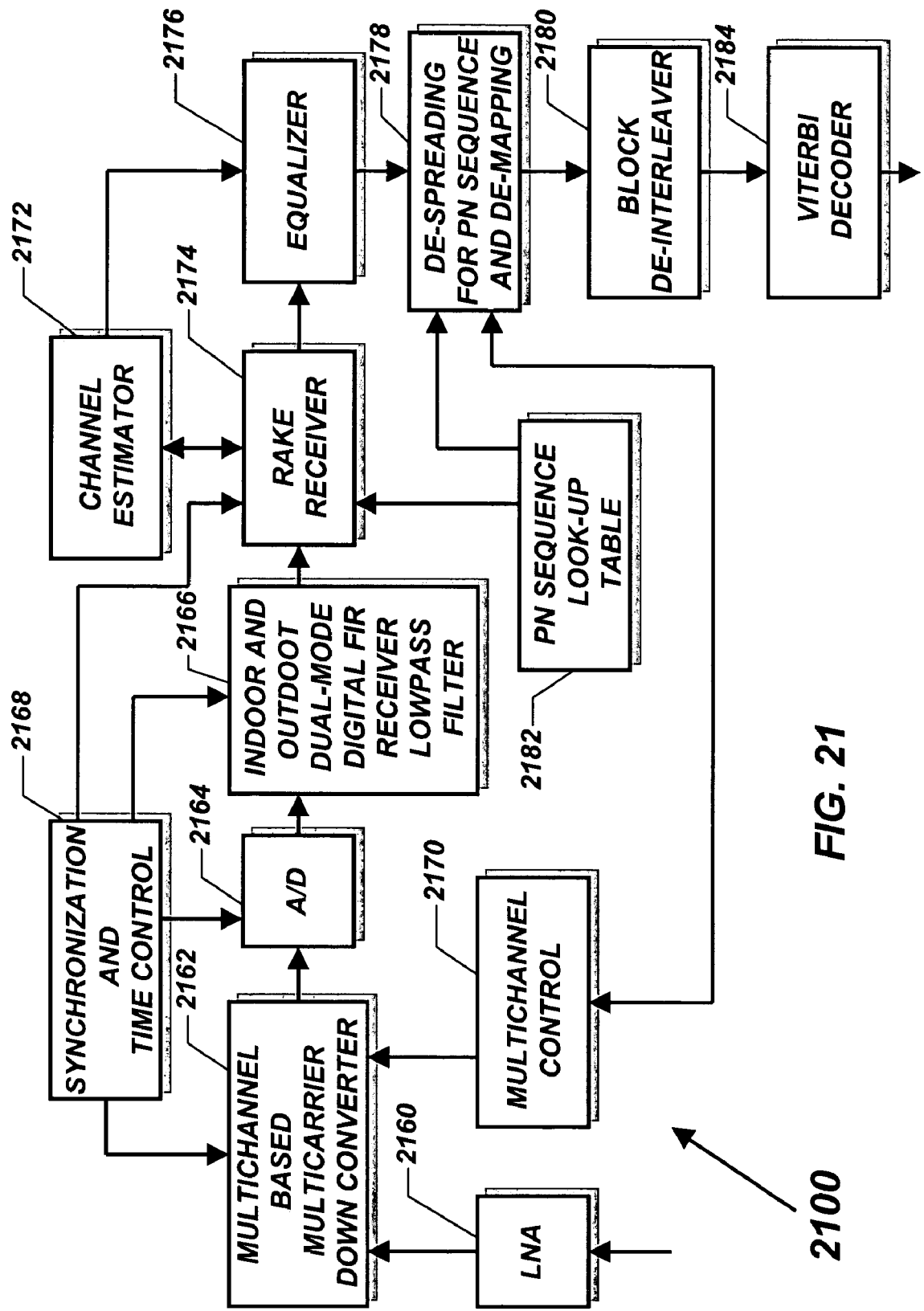
FIG. 21 is a block diagram showing a dual-mode UWB communication receiver for the indoor and outdoor operations according to some embodiments.

FIG. 21 is a block diagram of a dual-mode UWB communication receiver 2100 for the indoor and outdoor operations according to some embodiments. A low noise amplifier (LNA) 2160, which is coupled to a multichannel-based multi-carrier down converter 2162, receives the UWB signals from an antenna. The output of the LNA 2160 is passed through the multichannel-based multi-carrier down converter 2162 to produce a baseband signal for an A/D converter 2164. A multichannel control 2170 and a synchronization and time control 2168 restrain the multichannel-based multi-carrier down converter 2162. B and limited UWB analog signals are then sampled and quantized by using the A/D converter 2164, with a sampling rate of 720 MHz. The digital output signals of the A/D converter 2164 are filtered by using an indoor or outdoor dual-mode digital lowpass FIR receiver filter 2166 to remove the out of band signals under controlling from the synchronization and time control 2168. The output signal of the indoor and outdoor dual-mode digital lowpass FIR receiver filter 2166 is used for a rake receiver 2174. A channel estimator 2172 is used to estimate a channel phase and frequency that are passed into the rake receiver 2174. The rake receiver 2174 calculates a correlation between received UWB signals and channel spread sequences, which are provided by using a PN sequence look-up table 2182, and performs a coherent combination. The output signal of the rake receiver 2174 is passed to an equalizer 2176, which also receives information from the channel estimator 2172, to eliminate inter-symbol interference (ISI) and inter-channel interference (ICI). Then, the output signal of the equalizer 2176 produces the signals, which are despreaded and demapped by using a de-spreading of PN sequence and de-mapping 2178, to form UWB signals with a symbol rate at 446.875 Msps. The UWB signals are then de-interleaved by using a block de-interleaver 2180. Thus, the output signal of the block de-interleaver 2180 is used for a Viterbi decoder 2184 to decode encoded data and to produce a data rate at 223.4375 Mbps.

Figure 22:
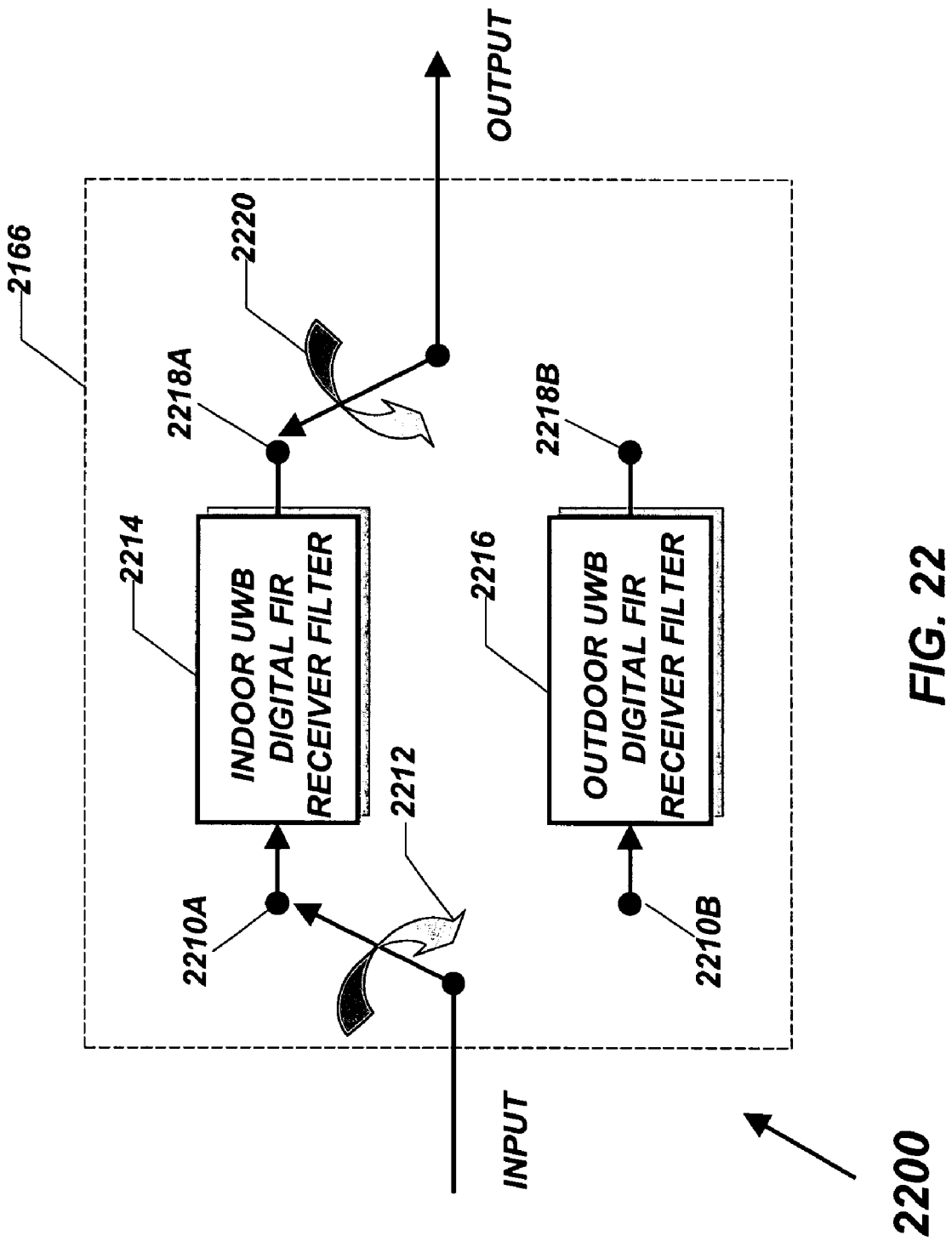
FIG. 22 is a block diagram showing one embodiment of dual-mode digital receiver filters of the present invention.

Referring to FIG. 22, which is a detailed block diagram 2200 showing one embodiment of the indoor and outdoor dual-mode digital lowpass FIR receiver filter 2166 of the present invention. During the indoor UWB receiver mode, a switch 2212 connects to a position 2210A and a switch 2220 connects to a position 2218A. In this case, the dual-mode digital lowpass FIR receiver filter is used for the indoor UWB communication receiver. During the outdoor UWB receiver mode, the switch 2212 connects to a position 2210B and the switch 2220 connects to a position 2218B. Thus, in this case, the dual-mode digital lowpass FIR receiver filter is used for the outdoor UWB communication receiver.

Figure 23:
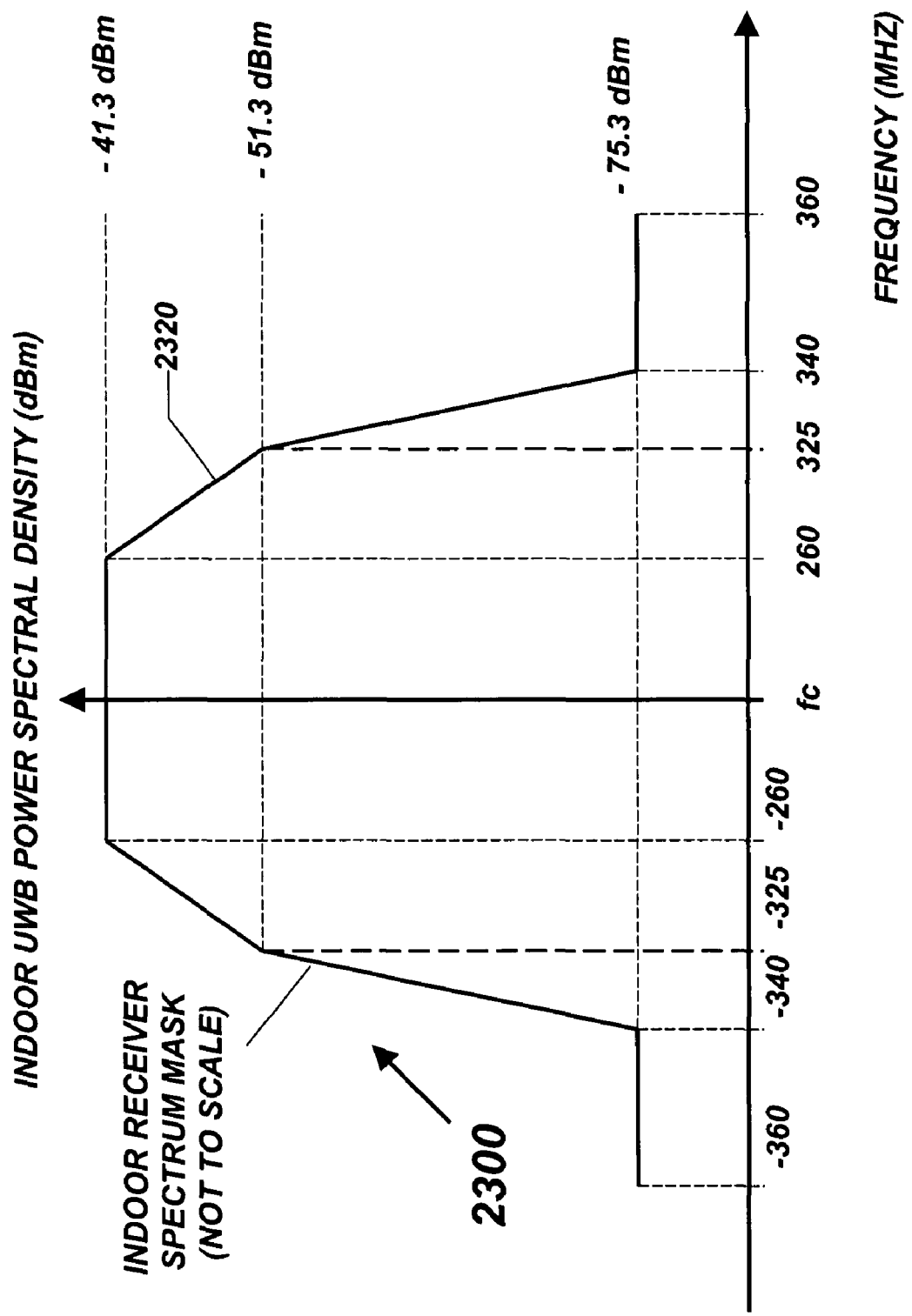
FIG. 23 is a receiver spectrum mark of the indoor power spectrum density (dBm) according to some embodiments.

FIG. 23 is a receiver spectrum mask 2320 of an indoor UWB power spectrum density 2300 according to some embodiments. The magnitudes (dBm) of the frequency response with an error of $\pm\delta_i (i=1, 2, 3)$ according to the frequencies (MHz) are given by, $$(-41.3-\delta_1) \leq |H(f)| \leq (-41.3+\delta_1), |f-f_c| \leq 260, \quad (3)$$

$$|H(f)| \leq (-51.3+\delta_2), |f-f_c|=325, \quad (4)$$

$$|H(f)| \leq (-75.3+\delta_3), 340 \leq |f-f_c| \leq 360. \quad (6)$$

The indoor receiver spectrum mark 2320 serves as a guide to design a digital lowpass FIR receiver filter for the indoor UWB communication receiver.

Figure 24:
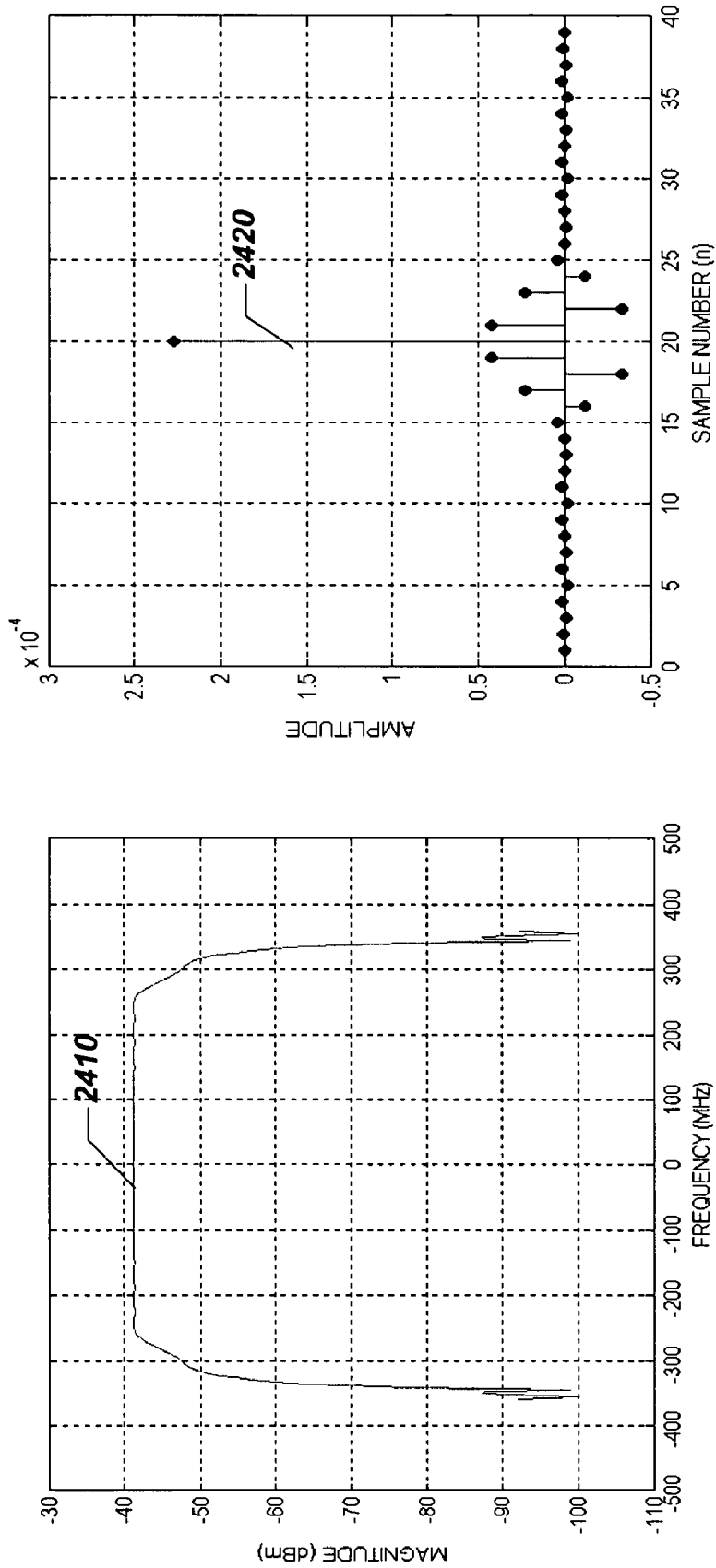
FIG. 24 is a frequency and impulse response of an indoor digital receiver filter according to one embodiment.

Referring to FIG. 24 is a frequency and impulse response 2400 of the indoor digital lowpass FIR receiver filter according to some embodiments. The impulse response 2420 of the indoor digital lowpass FIR receiver filter has an odd symmetric and linear phase with a total of 39 filter coefficients. Thus, the computation complexity of the indoor digital lowpass FIR receiver filter 2420 has 19 multiplications and 38 additions. Table 7 lists all of the indoor digital lowpass FIR receiver filter coefficients.

TABLE 7

| Coefficients | Value |
| --- | --- |
| h[0] | 2.2711340594043999e−004 |
| h[−1],h[1] | 4.2079839082892464e−005 |
| h[−2],h[2] | −3.3790355985451722e−005 |
| h[−3],h[3] | 2.2800600739704647e−005 |
| h[−4],h[4] | −1.2124392687415319e−005 |
| h[−5],h[5] | 4.2180879116521021e−006 |
| h[−6],h[6] | −1.1365258519547985e−007 |
| h[−7],h[7] | −6.3388913197064538e−007 |
| h[−8],h[8] | −4.7720212586639754e−007 |
| h[−9],h[9] | 1.8041014288773825e−006 |
| h[−10],h[10] | −2.2153543980269178e−006 |
| h[−11],h[11] | 1.4968638128566580e−006 |
| h[−12],h[12] | −1.1830118105096312e−007 |
| h[−13],h[13] | −1.1477807925811817e−006 |
| h[−14],h[14] | 1.7805637473547527e−006 |
| h[−15],h[15] | −1.6754436913295128e−006 |
| h[−16],h[16] | 1.1620898376791844e−006 |
| h[−17],h[17] | −6.5665355826769077e−007 |
| h[−18],h[18] | 4.6288213011845176e−007 |
| h[−19],h[19] | −5.6171814558031744e−007 |

Figure 25:
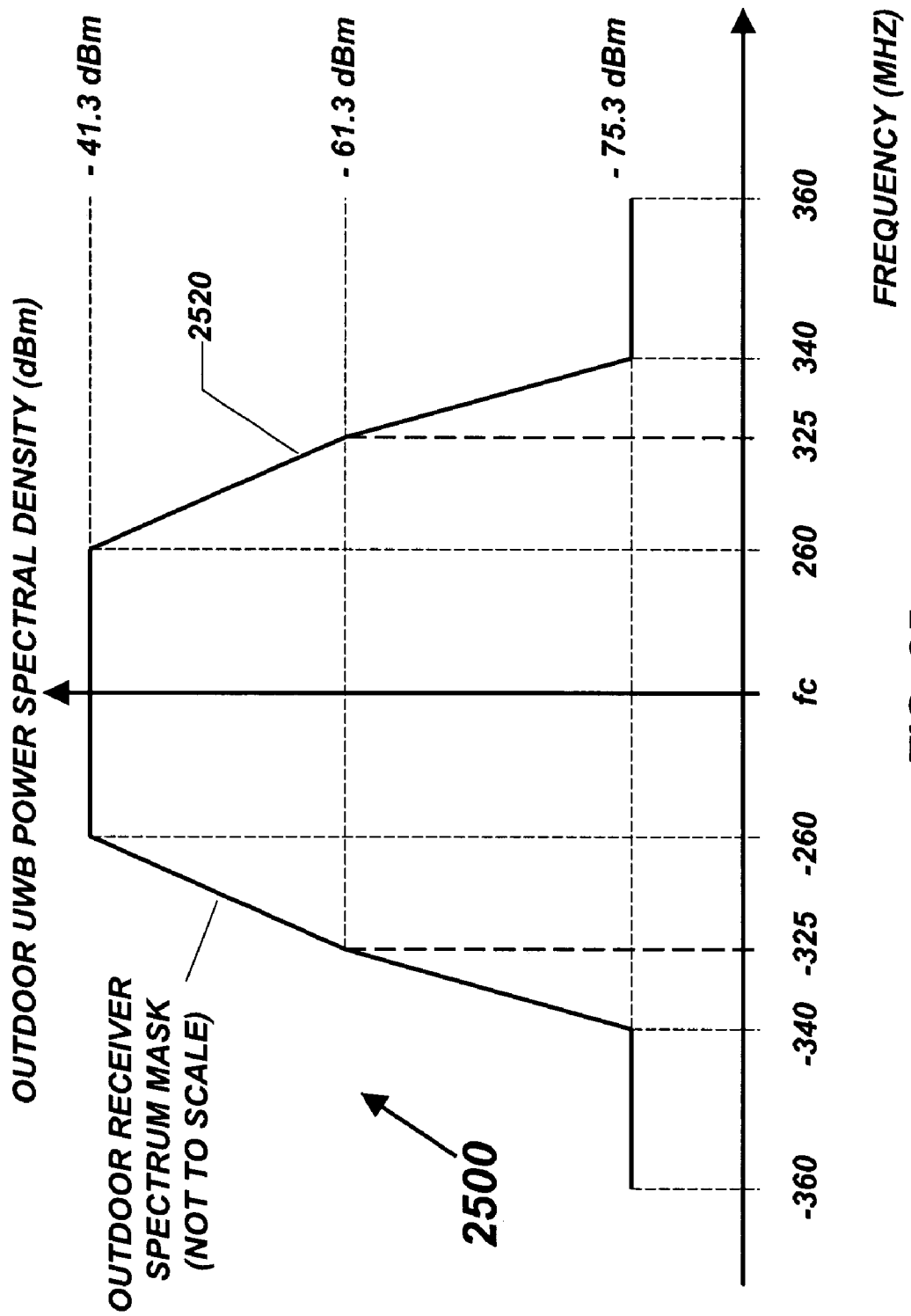
FIG. 25 is a receiver spectrum mark of the outdoor power spectrum density (dBm) according to some embodiments.

FIG. 25 is a receiver spectrum mask 2520 of an outdoor UWB power spectrum density 2500 according to some embodiments. The magnitudes (dBm) of the frequency response with an error of $\pm\delta_i$ (i=1, 2, 3) according to the frequencies (MHz) are given by, $$(-41.3-\delta_1) \leq |H(f)| \leq (-41.3+\delta_1), |f-f_c| \leq 260, \quad (3)$$

$$|H(f)| \leq (-61.3+\delta_2), |f-f_c| = 325, \quad (4)$$

$$|H(f)| \leq (-75.3+\delta_3), 340 \leq |f-f_c| \leq 360. \quad (5)$$

The outdoor receiver spectrum mark 2520 serves as a guide to design a digital lowpass FIR receiver filter for the outdoor UWB communication receiver.

Figure 26:
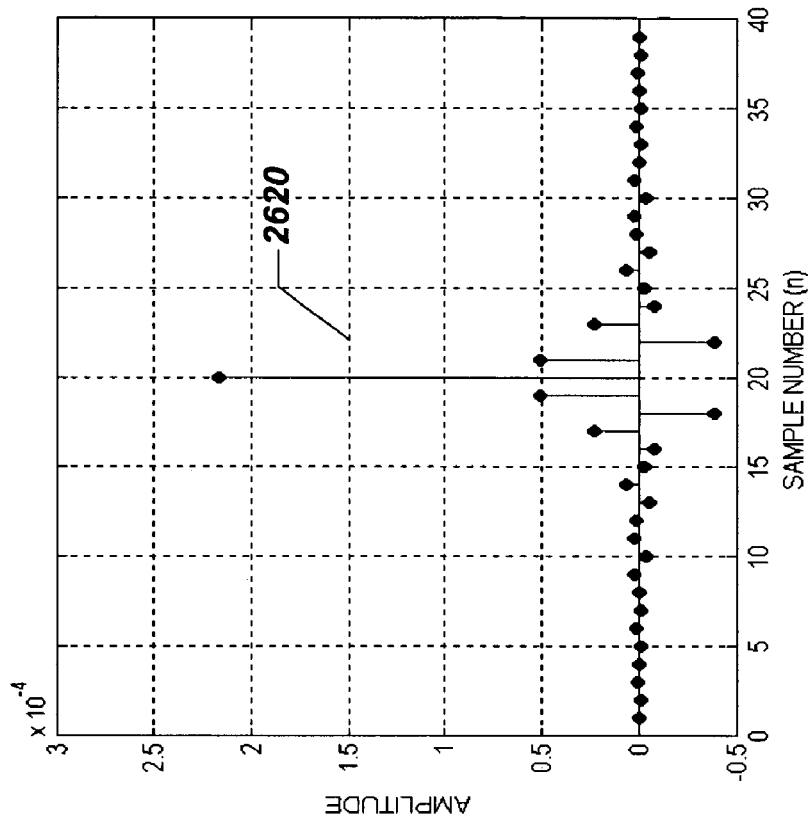
FIG. 26 is a frequency and impulse response of an outdoor digital receiver filter according to one embodiment.
Figure 26:
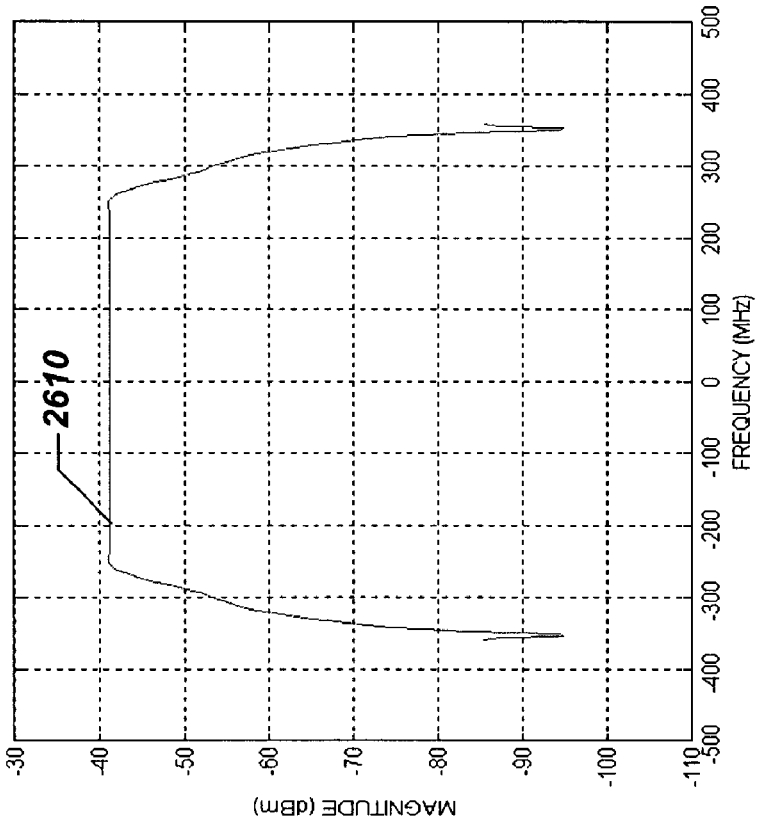

Referring to FIG. 26 is a frequency and impulse response 2600 of the outdoor digital lowpass FIR receiver filter according to some embodiments. The impulse response 2620 of the outdoor digital lowpass FIR receiver filter has odd symmetric filter coefficients and is a linear phase with a total of 39 filter coefficients. Thus, the computation complexity of the outdoor digital lowpass FIR receiver filter 2620 has 19 multiplications and 38 additions. Table 8 lists all of the outdoor digital lowpass FIR receiver filter coefficients.

TABLE 8

| Coefficients | Value |
| --- | --- |
| h[0] | 2.1659294012222948e−004 |
| h[−1],h[1] | 5.1010900807138207e−005 |
| h[−2],h[2] | −3.8577600935448179e−005 |
| h[−3],h[3] | 2.2434916624067460e−005 |
| h[−4],h[4] | −7.4313753473442792e−006 |
| h[−5],h[5] | −2.6722025657057541e−006 |
| h[−6],h[6] | 6.5007896593555187e−006 |
| h[−7],h[7] | −5.1746497965425773e−006 |
| h[−8],h[8] | 1.3955837238699170e−006 |
| h[−9],h[9] | 2.0273922562789145e−006 |
| h[−10],h[10] | −3.3766314744991133e−006 |
| h[−11],h[11] | 2.5193334120019112e−006 |
| h[−12],h[12] | −5.1162314715269453e−007 |
| h[−13],h[13] | −1.2437956638809358e−006 |

TABLE 8-continued

| Coefficients | Value |
| --- | --- |
| h[−14],h[14] | 1.8528143860654983e−006 |
| h[−15],h[15] | −1.2782534000936749e−006 |
| h[−16],h[16] | 1.7904952933954231e−007 |
| h[−17],h[17] | 6.4369115613109251e−007 |
| h[−18],h[18] | −7.2838193152203750e−007 |
| h[−19],h[19] | 1.7807071893959747e−007 |

Figure 27:
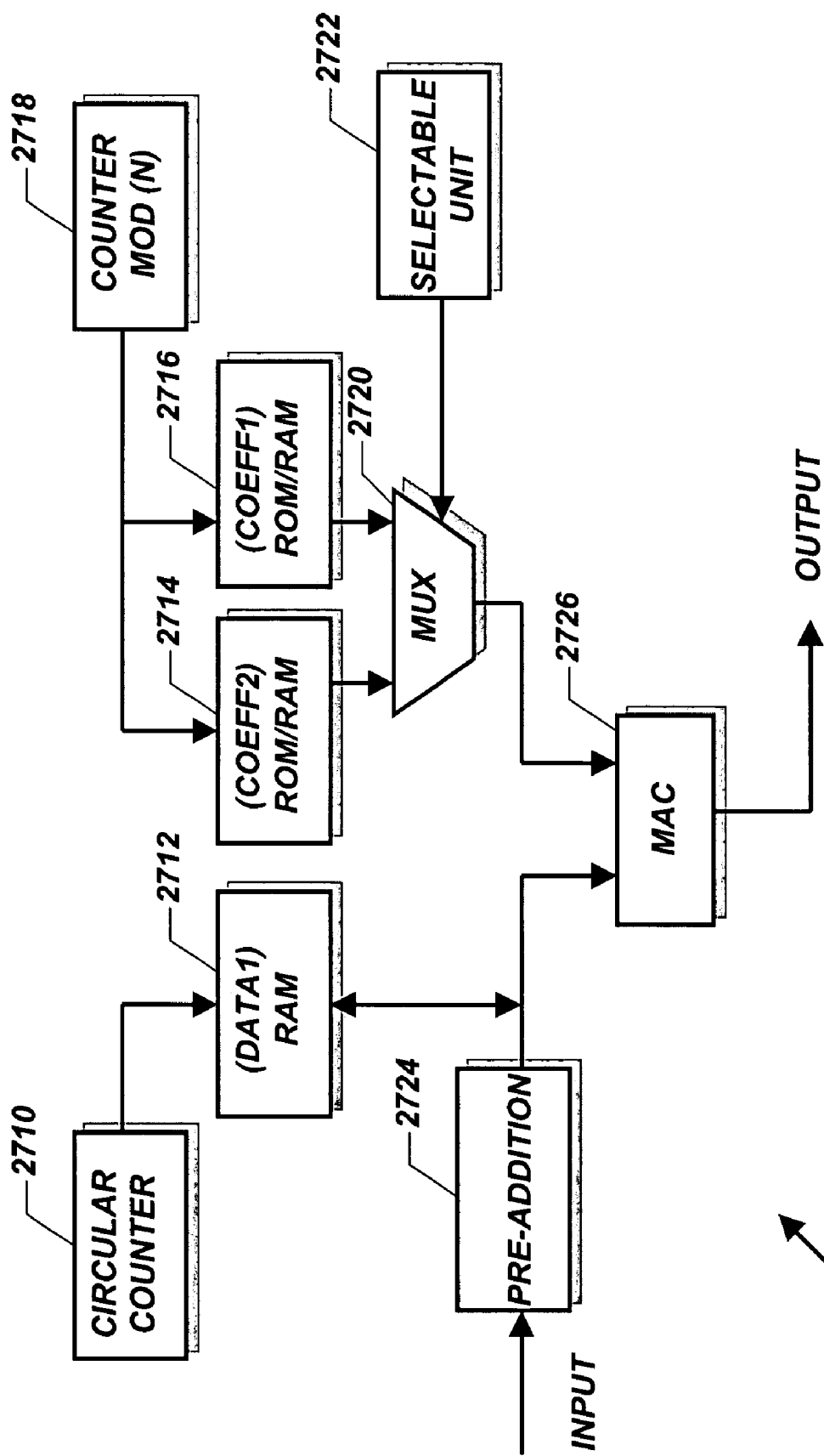
FIG. 27 is a block diagram showing the dual-mode architecture of the digital receiver filter for the indoor and outdoor operation according to some embodiments.

FIG. 27 is a block diagram showing the dual-mode architecture of the digital lowpass FIR receiver filter for the indoor and outdoor operations according to some embodiments. Three different memory banks 2712, 2714 and 2716 are used. Two memory banks 2714 and 2716, which may be ROM for single-purpose filters or RAM for programmable filters, are dedicated to the filter coefficients that are fixed in values during indoor and outdoor operation. The memory bank 2714 contains the indoor digital lowpass FIR receiver filter coefficients 2420. The memory bank 2716 includes the outdoor digital lowpass FIR receiver filter coefficients 2620. The other memory bank 2712 is data memory such as RAM to set aside for the input samples. The data memory bank 2712 act as the circular buffer.

The input samples are passed through a pre-addition unit 2724 to perform the symmetric addition operation. The output samples of the pre-addition 2724 are stored into the data memory bank 2712 with the circular buffer by controlling a circular counter 2710. A selectable unit 2722 controls a MUX unit 2720 to select either the memory bank 2714 or the memory bank 2716 with a counter modular 2718. A selected memory bank, either the memory bank 2714 or the memory bank 2716, operates with the input samples in the data memory bank 2712 by using a MAC unit 2726 to produce the filter output.

Figure 28:
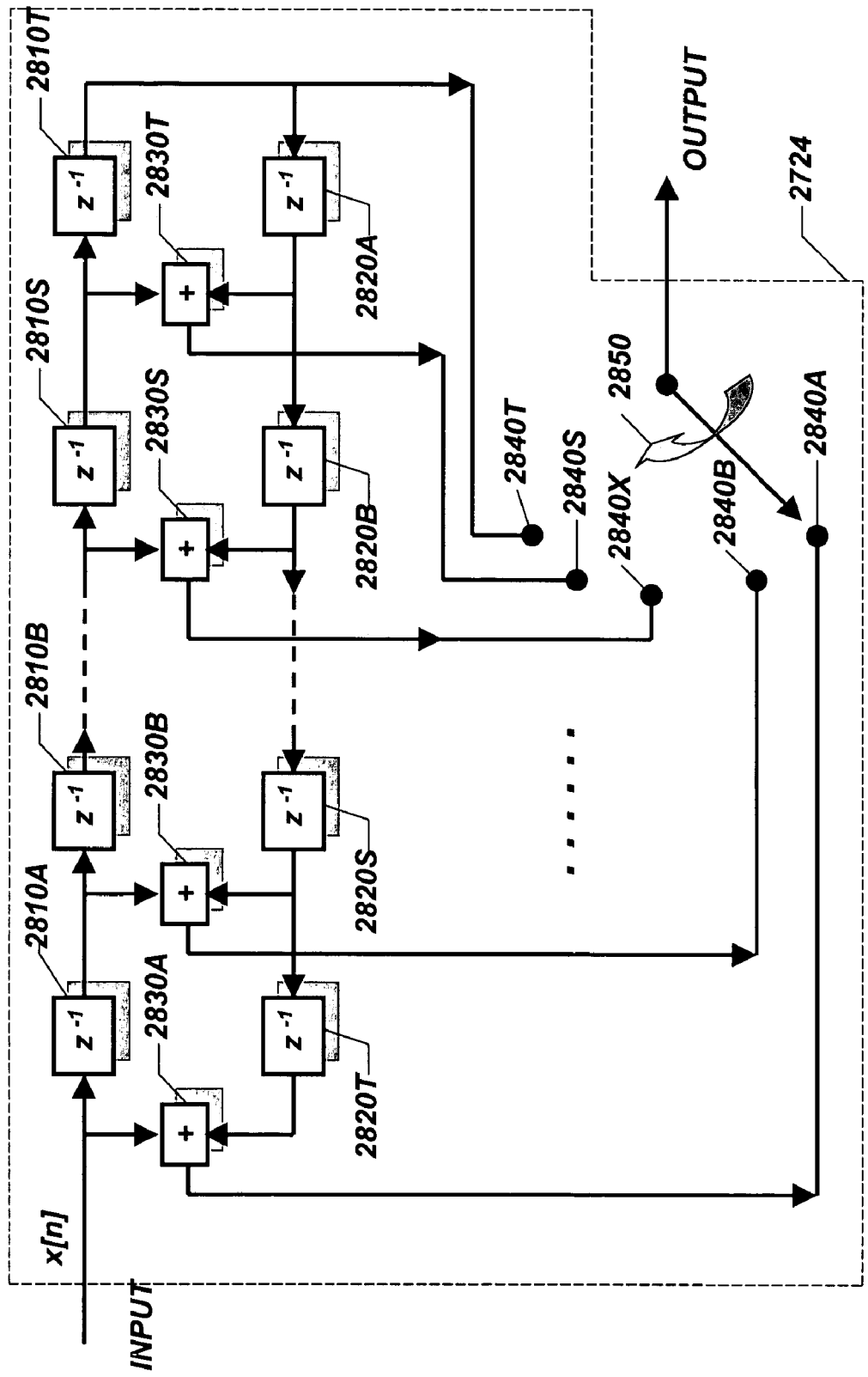
FIG. 28 is a block diagram showing a pre-addition architecture using in the dual-mode digital receiver filter according to some embodiments.

Referring to FIG. 28, which is a detailed block diagram 2800 showing one embodiment of the pre-addition unit 2724 of the present invention. The units 2810A–2810T and units 2820A–2820T are called one sample delay unit. There are a total of 38 sample delay units. The units 2830A–2830T are referred to as the addition operation unit. There are a total of 19 addition operation units. The input samples x[n] are passed through the delay and addition operation units to produce the output samples as follows:

$$q[n-k]=x[n-k]+x[n-50+k], \text{ for } k=0, 1, 2, \ldots, 18.$$

$$q[n-k]=x[n-k], \text{ for } k=19.$$

Then, a switch 2850 sequentially connects to positions 2840A–2840T until the last sample is finished. Thus, the pre-addition unit 2800 may achieve the pre-addition calculation for the input samples that are used to reduce computations when the output samples q[n] are multiplied with the odd symmetric filter coefficients.

Figure 29:
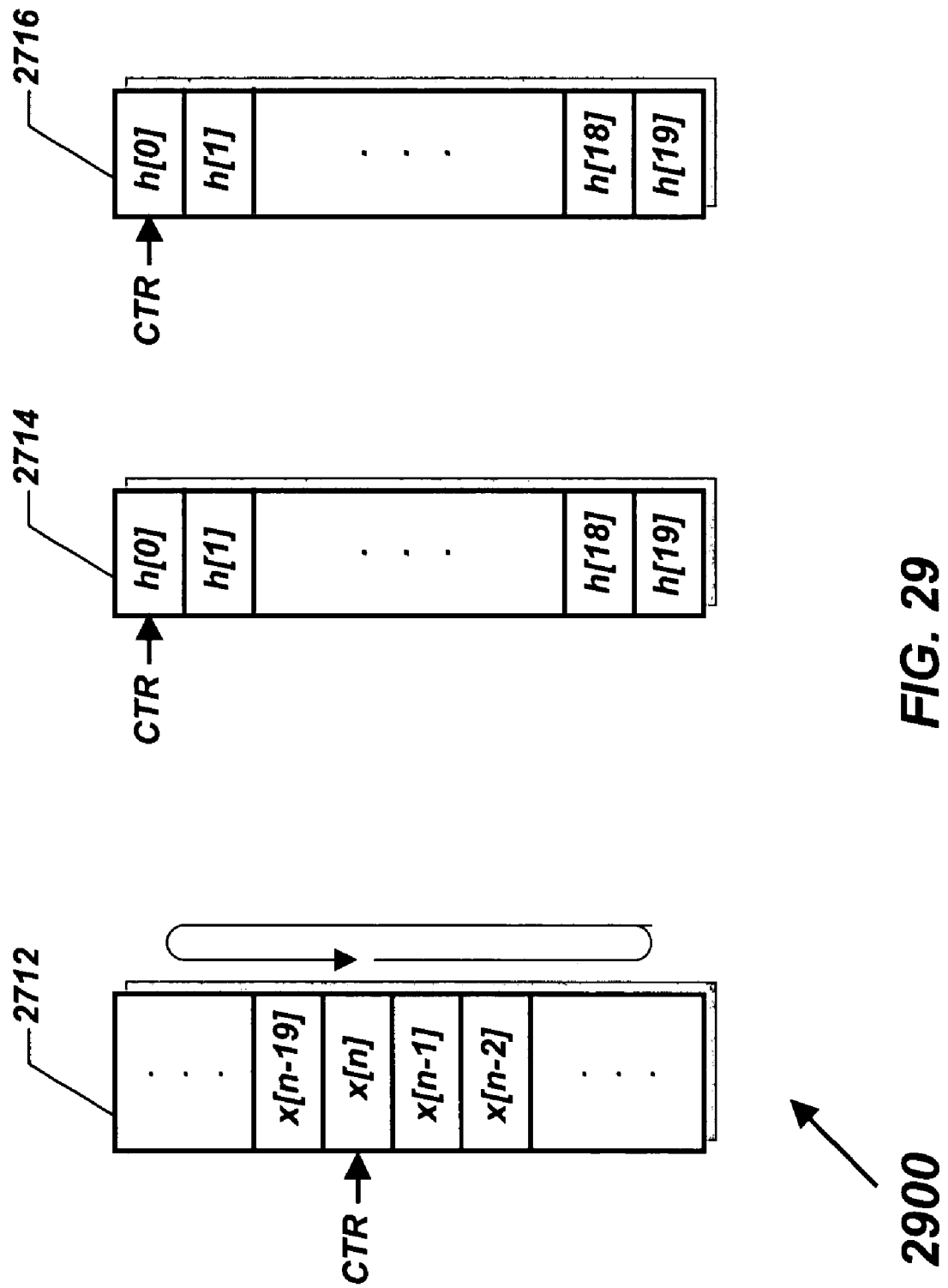
FIG. 29 is a block diagram showing memory structures that contains the receiver filter coefficients and input samples according to some embodiments.

Referring to FIG. 29, which is a detailed block diagram 2900 showing the filter coefficient memory banks and the data memory banks. The memory banks 2714 and 2716 contain the indoor digital lowpass FIR receiver filter coefficients 2420 and the outdoor digital lowpass FIR receiver filter coefficients 2620, with the counter modular. The data memory bank 2712 contains the input data samples, with the circular counter.

Figure 30:
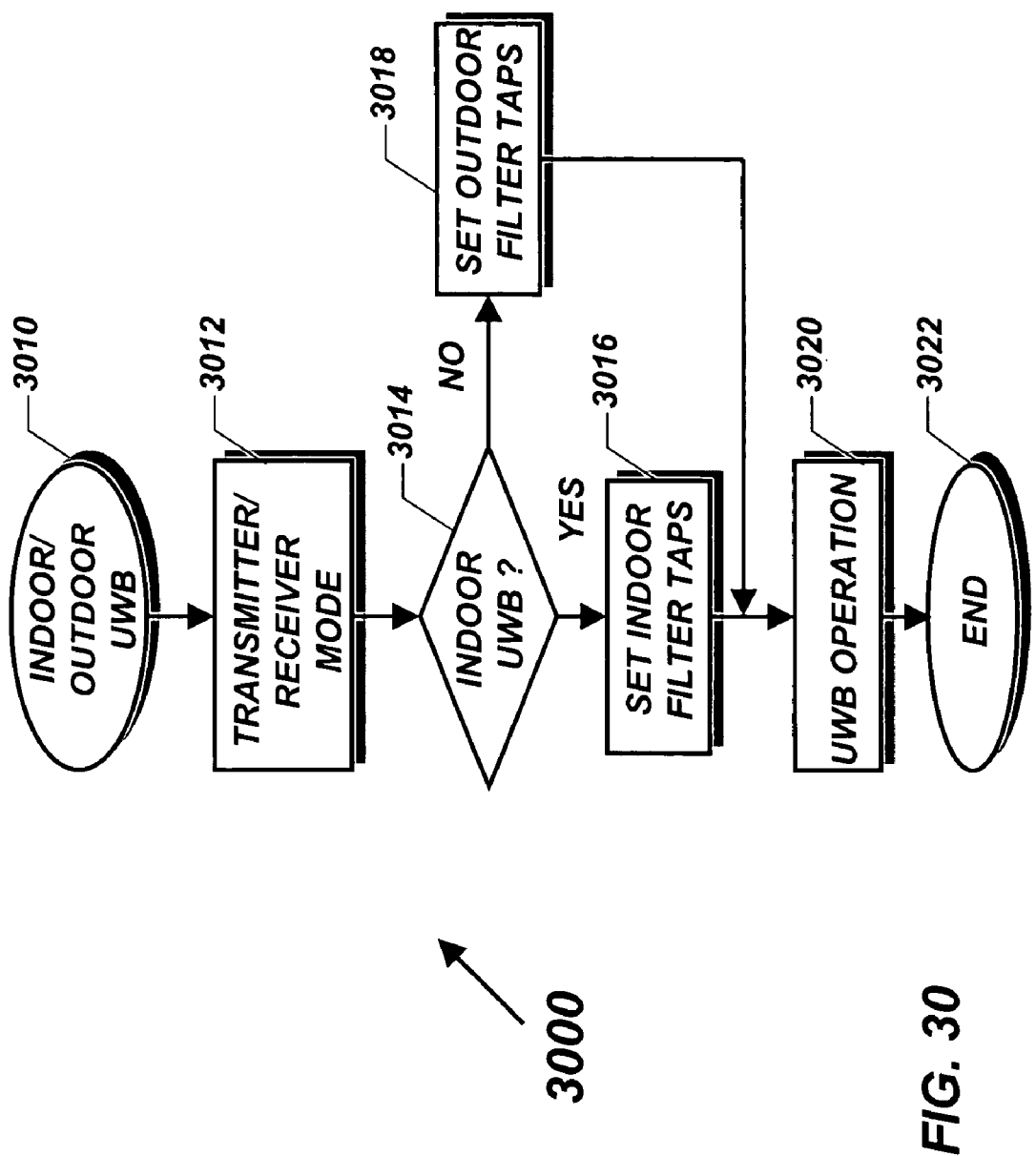
FIG. 30 is a block diagram showing a flowchart implementation of the dual-mode UWB communication transceiver for the indoor and outdoor operations according to some embodiments.

FIG. 30 is a block flowchart showing a dual-mode indoor and outdoor UWB communication transceiver with transmitter and receiver modes according to some embodiments. An indoor and outdoor UWB 3010 is connected with a transmitter or a receiver mode 3012, which is also coupled to an indoor UWB 3014. The indoor UWB 3014 is used to determine whether the indoor mode or the outdoor mode should be used. If the indoor mode is selected, indoor filters are used. Otherwise, outdoor filters are used. Then, the UWB communication transceiver is into an UWB operation. An end 3020 is to finish a program.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A dual-mode transceiver of indoor and outdoor Ultra Wideband (UWB) communications comprising:
   an indoor digital enlarged band lowpass-shaping finite impulse response (FIR) transmitter filter for an indoor UWB operation;
   an outdoor digital enlarged band lowpass-shaping FIR transmitter filter for an outdoor UWB operation; and
   a common digital rejected image spectrum FIR transmitter filter.

2. The dual-mode transceiver of claim 1 wherein two cascade digital filters of said indoor digital enlarged band lowpass-shaping FIR transmitter filter and said common digital rejected image spectrum FIR transmitter filter are used to implement an indoor UWB transceiver.

3. The dual-mode transceiver of claim 1 wherein two cascade digital filters of said outdoor digital enlarged band lowpass-shaping FIR transmitter filter and said common digital rejected image spectrum FIR transmitter filter are used to implement an outdoor UWB transceiver.

4. The dual-mode transceiver of claim 1 wherein said common digital rejected image spectrum FIR transmitter filter comprising two filter structures is only one filter that can be used for both indoor and outdoor UWB operation modes.

5. The dual-mode transceiver of claim 4 wherein said common digital rejected image spectrum FIR transmitter filter contains two sub-filters, one sub-filter with even filter taps and other sub-filter with odd filter taps.

6. The dual-mode transceiver of claim 5 wherein said even tap sub-filter and said odd tap sub-filter stored in memory banks are implemented in a polyphase structure by controlling a switch.

7. The dual-mode transceiver of claim 1 wherein said indoor digital enlarged band lowpass-shaping FIR transmitter filter coupled to said common digital rejected image spectrum FIR transmitter filter is a combination interpolation lowpass-shaping FIR transmitter filter by upsampling of 2 for implementing the indoor UWB transceiver.

8. The dual-mode transceiver of claim 1 wherein said outdoor digital enlarged band lowpass-shaping FIR transmitter filter coupled to said common digital rejected image spectrum FIR transmitter filter is a combination interpolation lowpass-shaping FIR transmitter filter by upsampling of 2 for implementing the outdoor UWB transceiver.

9. The dual-mode transceiver of claim 1 wherein said indoor digital enlarged band lowpass-shaping FIR transmitter filter and said outdoor digital enlarged band lowpass-shaping FIR transmitter filter and said common digital rejected image spectrum FIR transmitter filter stored in memory banks are programmable filter taps.

10. The dual-mode transceiver of claim 9 wherein said indoor and outdoor digital enlarged band lowpass-shaping FIR transmitter filters are programmable to have 51 odd symmetric filter taps, and said common digital rejected image spectrum FIR transmitter filter is programmable to have 6 even symmetric filter taps.

11. A dual-mode implementation system of a digital lowpass-shaping FIR transmission filter comprising:
    a set of memory banks;
    a set of counter units;
    a set of multiply and accumulate (MAC) units;
    a pre-addition unit;
    a multiplexer (MUX) unit; and
    a selectable unit.

12. The dual-mode implementation system of the digital lowpass-shaping FIR transmission filter of claim 11 wherein input samples are added together with symmetric using said pre-addition unit.

13. The dual-mode implementation system of the digital lowpass-shaping FIR transmission filter of claim 11 wherein said MUX unit with said selectable unit is used to select either said memory bank of indoor digital enlarged band FIR transmitter filter coefficients or said memory bank of outdoor digital enlarged band FIR transmitter filter coefficients.

14. The dual-mode implementation system of the digital lowpass-shaping FIR transmission filter of claim 11 wherein the first stage outputs in a data memory bank may be multiplied with common digital rejected image spectrum FIR transmitter filter taps in polyphase memory banks to produce outputs for a digital-to-analog (A/D) converter.

15. The dual-mode implementation system of the digital lowpass-shaping FIR transmission filter of claim 14 wherein a reconstruction analog filter and said A/D converter are used for both indoor and outdoor UWB transceivers.

16. A dual-mode indoor and outdoor ultra wideband (UWB) communication receiver comprising:
    an analog-to-digital (A/D) converter coupled to a dual-mode digital receiver filter;
    said dual-mode digital receiver filter further including an indoor digital lowpass finite impulse response (FIR) receiver filter and an outdoor digital lowpass FIR receiver filter;
    said indoor digital lowpass FIR receiver filter and said outdoor digital lowpass FIR receiver filter having filter masks including a passband, two transition bands, and a stopband;
    two switches; and
    said two switches can be controlled to select either said indoor digital lowpass FIR receiver filter for an indoor UWB operation or said outdoor digital lowpass FIR receiver filter for an outdoor UWB operation.

17. The dual-mode indoor and outdoor UWB communication receiver of claim 16 wherein said indoor digital lowpass FIR receiver filter and said outdoor digital lowpass FIR receiver filter are programmable to have 39 filter taps with odd symmetric, and a selectable unit to control said two switches to connect either said indoor digital lowpass FIR receiver filter with said A/D converter or said outdoor digital lowpass FIR receiver filter with said A/D converter.

18. An article comprising a medium for storing instructions that cause a digital signal processor-based dual-mode indoor and outdoor UWB transceiver to:
    Selectively set a memory bank of a transmitter filter in the first filtering stage depending on whether an indoor or outdoor UWB transmission signal has been detected; and resulting output of the first filtering stage as input samples are filtered by a common digital rejected transmitter filter;

Selectively set a memory bank of a receiver filter depending on whether an indoor or outdoor UWB receiver signal has been received.

19. The article of claim 18 further storing instructions that cause a digital signal processor-based dual-mode indoor and outdoor UWB transmitter to control a multiplexer (MUX) unit to select either the memory bank of indoor digital enlarged band lowpass-shaping FIR transmitter filter taps or the memory bank of outdoor digital enlarged band lowpass-shaping FIR transmitter filter taps to be multiplied with the input samples as outputs followed by a polyphase-based digital rejected FIR transmitter filter.

20. The article of claim 18 further storing instructions that cause a digital signal processor-based dual-mode indoor and outdoor UWB receiver to control a MUX unit to select either the memory bank of indoor digital FIR receiver filter taps or the memory bank of outdoor digital FIR receiver filter taps to be multiplied with the input samples.

* * * * *